US012597087B2

(12) United States Patent
Obert et al.

(10) Patent No.: US 12,597,087 B2
(45) Date of Patent: Apr. 7, 2026

(54) HIGH-PERFORMANCE AND LOW-LATENCY IMPLEMENTATION OF A WAVELET-BASED IMAGE COMPRESSION SCHEME

(71) Applicant: QUALCOMM Incorporated, San Diego, CA (US)

(72) Inventors: Juraj Obert, Carlsbad, CA (US); Aravind Srinivasa Raghavan, San Diego, CA (US); Rex Perkins, Medway, MA (US); Mark Dale Haack, Ormond Beach, FL (US); Janardhan Haryadi Ramesh, San Diego, CA (US); Kevin Hawkins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 18/449,613

(22) Filed: Aug. 14, 2023

(65) Prior Publication Data

US 2024/0078628 A1      Mar. 7, 2024

Related U.S. Application Data

(60) Provisional application No. 63/373,991, filed on Aug. 30, 2022.

(51) Int. Cl.
*G06T 1/20*          (2006.01)
*G06T 9/00*          (2006.01)

(52) U.S. Cl.
CPC . *G06T 1/20* (2013.01); *G06T 9/00* (2013.01)

(58) Field of Classification Search
CPC ........................................................ G06T 1/20
See application file for complete search history.

(56) References Cited

U.S. PATENT DOCUMENTS 9,773,334 B1 *   9/2017   Walker ...................... G06T 5/73
2002/0186892 A1   12/2002   Acharya et al.
(Continued)

OTHER PUBLICATIONS

Anilkumar P.H., et al., "Lifting-based Discrete Wavelet Transform for Real-Time Signal Detection", Indian Journal of Science & Technology, vol. 8, No. 25, Oct. 10, 2015, pp. 1-6, XP93107960, section 1, p. 1, right column to p. 2, left col. 1st par.
(Continued)

*Primary Examiner* — Kee M Tung
*Assistant Examiner* — Khoa Vu
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for a high-performance and low-latency implementation of a wavelet-based image compression scheme. A processor may generate, in a single pass for each of a plurality of horizontal and vertical divisions of an image frame, a set of wavelet coefficients for the image frame based on a DWT. The processor may select a set of bits associated with the set of wavelet coefficients to remove based on an entropy coding process. The processor may serialize the set of wavelet coefficients, where the set of serialized wavelet coefficients do not include the set of bits. The processor may output, for a second device, a bitstream including the set of serialized wavelet coefficients.

30 Claims, 21 Drawing Sheets

(56) References Cited

U.S. PATENT DOCUMENTS

| | | | |
|---|---|---|---|
| 2003/0219162 A1* | 11/2003 | Sano | H04N 19/645 |
| | | | 382/248 |
| 2006/0023963 A1 | 2/2006 | Boliek et al. | |
| 2006/0228028 A1 | 10/2006 | Kadowaki | |
| 2010/0118935 A1 | 5/2010 | Kakii et al. | |
| 2016/0142737 A1* | 5/2016 | Smith | H04N 19/42 |
| | | | 375/240.19 |
| 2017/0013278 A1* | 1/2017 | Mizuno | H04N 19/647 |
| 2023/0230283 A1* | 7/2023 | Richter | H04N 19/63 |
| | | | 382/232 |

OTHER PUBLICATIONS

Anonymous: "JPEG XS—Wikipedia", Dec. 5, 2023, 11 Pages, XP093108909, the whole document.
International Search Report and Written Opinion—PCT/US2023/030269—ISA/EPO—Feb. 28, 2024.
IntoPIX: "IntoPIX Codec Submission for JPEG-XS CfP, Design Description V0.1", 73. JPEG Meeting, Oct. 14, 2016-Oct. 21, 2016, Chengdu, (Joint Picture Expert Group Or ISO/IEC JTC1/SC29/WG1), No. wg1m73019, Sep. 23, 2016, 46 Pages, XP030190195, The whole document.
Partial International Search Report—PCT/US2023/030269—ISA/EPO—Dec. 14, 2023.

* cited by examiner

200

DWT

GPU 1
408

Input Image
602

After 2 Passes
604

After DWT
606

GPU 1 408

DWT

Dispatch 1 702

Dispatch 2 704

Dispatch 3 706

Dispatch 4 708

Dispatch 5 710

Dispatch 6 712

Dispatch 7 714

Copy 1 716

Copy 2 718

700

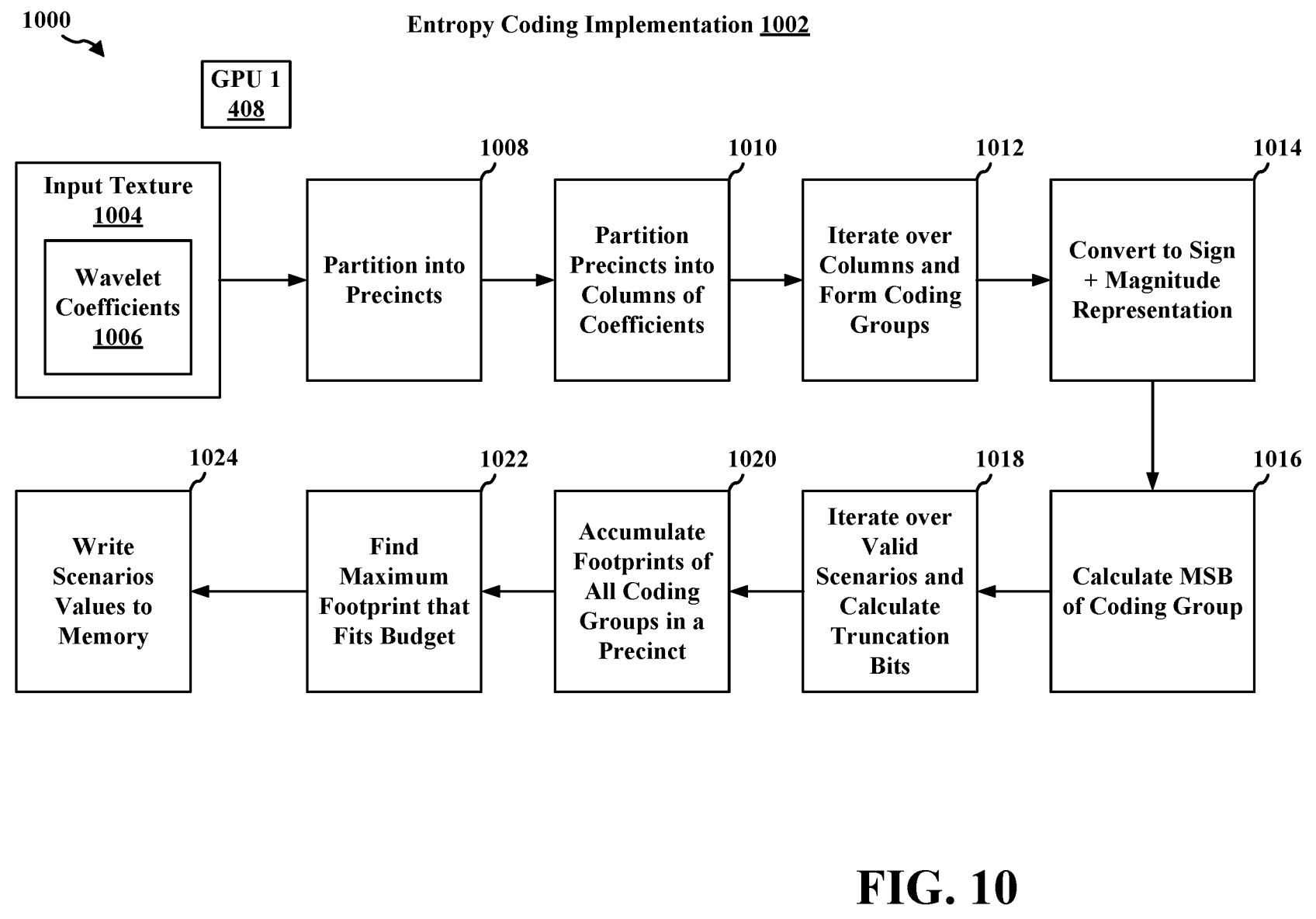

Entropy Coding Implementation 1002

GPU 1
408

1000

Input Texture 1004

Wavelet Coefficients 1006

1008 — Partition into Precincts

1010 — Partition Precincts into Columns of Coefficients

1012 — Iterate over Columns and Form Coding Groups

1014 — Convert to Sign + Magnitude Representation

1016 — Calculate MSB of Coding Group

1018 — Iterate over Valid Scenarios and Calculate Truncation Bits

1020 — Accumulate Footprints of All Coding Groups in a Precinct

1022 — Find Maximum Footprint that Fits Budget

1024 — Write Scenarios Values to Memory

FIG. 10

Example 1102 – Partition into Precincts

Precinct 359

Precinct 2
Precinct 1
Precinct 0

2560

4

Precincts 1104

1100

Figure 13:
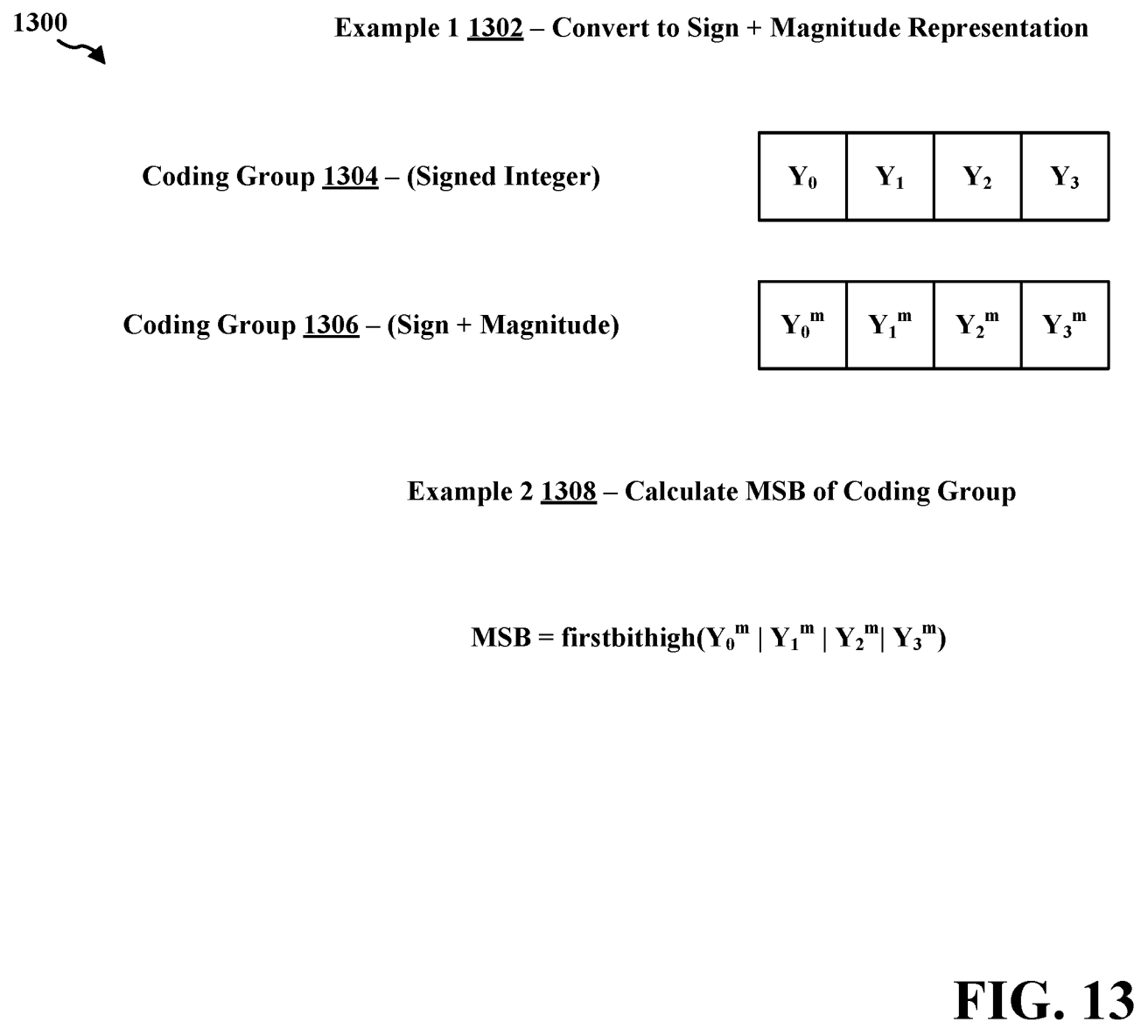

1300

Example 1 1302 – Convert to Sign + Magnitude Representation

Coding Group 1304 – (Signed Integer)

| $Y_0$ | $Y_1$ | $Y_2$ | $Y_3$ |
|---|---|---|---|

Coding Group 1306 – (Sign + Magnitude)

| $Y_0^m$ | $Y_1^m$ | $Y_2^m$ | $Y_3^m$ |
|---|---|---|---|

Example 2 1308 – Calculate MSB of Coding Group

$$MSB = firstbithigh(Y_0^m \mid Y_1^m \mid Y_2^m \mid Y_3^m)$$

FIG. 13 iDWT

DSP 414

GPU 2 416

GPU 2 416

GPU 2 416

Input 1602

Intermediate 1604

After iDWT 1606

1600

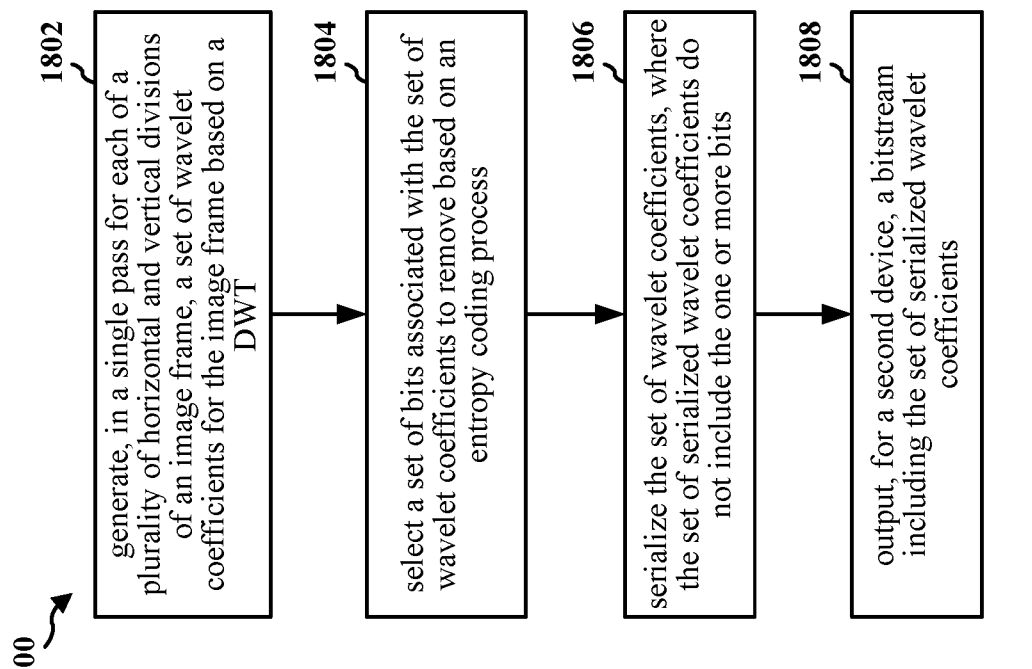

1800

1802 generate, in a single pass for each of a plurality of horizontal and vertical divisions of an image frame, a set of wavelet coefficients for the image frame based on a DWT 1804 select a set of bits associated with the set of wavelet coefficients to remove based on an entropy coding process 1806 serialize the set of wavelet coefficients, where the set of serialized wavelet coefficients do not include the one or more bits 1808 output, for a second device, a bitstream including the set of serialized wavelet coefficients

FIG. 18

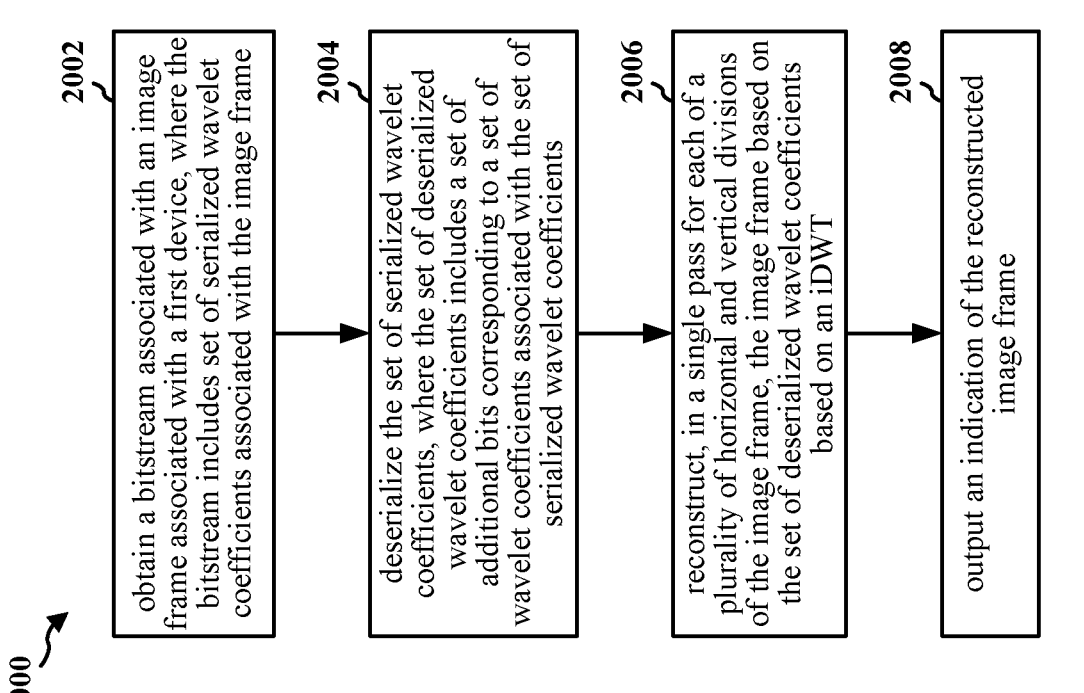

2000

2002 obtain a bitstream associated with an image frame associated with a first device, where the bitstream includes set of serialized wavelet coefficients associated with the image frame

2004 deserialize the set of serialized wavelet coefficients, where the set of deserialized wavelet coefficients includes a set of additional bits corresponding to a set of wavelet coefficients associated with the set of serialized wavelet coefficients

2006 reconstruct, in a single pass for each of a plurality of horizontal and vertical divisions of the image frame, the image frame based on the set of deserialized wavelet coefficients based on an iDWT

2008 output an indication of the reconstructed image frame

FIG. 20

HIGH-PERFORMANCE AND LOW-LATENCY IMPLEMENTATION OF A WAVELET-BASED IMAGE COMPRESSION SCHEME

CROSS REFERENCE TO RELATED APPLICATION(S)

This application claims the benefit of U.S. Provisional Application Ser. No. 63/373,991, entitled "HIGH-PERFOR-MANCE AND LOW-LATENCY IMPLEMENTATION OF A WAVELET-BASED IMAGE COMPRESSION SCHEME" and filed on Aug. 30, 2022, which is expressly incorporated by reference herein in its entirety.

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current image compression schemes may not be suitable for wireless streaming of high-resolution images between two wireless devices in a high-performance, low-latency, and energy efficient manner. There is a need for improved techniques for wireless streaming of high-resolution images between two wireless devices.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for graphics processing at a first device are provided. The apparatus includes a memory; and a processor coupled to the memory and, based on information stored in the memory, the processor is configured to: generate, in a single pass for each of a plurality of horizontal and vertical divisions of an image frame, a set of wavelet coefficients for the image frame based on a discrete wavelet transform (DWT); select a set of bits associated with the set of wavelet coefficients to remove based on an entropy coding process; serialize the set of wavelet coefficients, where the set of serialized wavelet coefficients do not include the set of bits; and output, for a second device, a bitstream including the set of serialized wavelet coefficients.

In an aspect of the disclosure, a method, a computer-readable medium, and an apparatus for graphics processing at a second device are provided. The apparatus includes a memory; and a processor coupled to the memory and, based on information stored in the memory, the processor is configured to: obtain a bitstream associated with an image frame associated with a first device, where the bitstream includes a set of serialized wavelet coefficients associated with the image frame; deserialize the set of serialized wavelet coefficients, where the set of deserialized wavelet coefficients includes a set of additional bits corresponding to a set of wavelet coefficients associated with the set of serialized wavelet coefficients; reconstruct, in a single pass for each of a plurality of horizontal and vertical divisions of the image frame, the image frame based on the set of deserialized wavelet coefficients based on an inverse discrete wavelet transform (iDWT); and output an indication of the reconstructed image frame.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a diagram illustrating an example entropy coding implementation in accordance with one or more techniques of this disclosure.

FIG. 13 is a diagram illustrating examples of converting to a sign and magnitude representation and calculating a most significant bit (MSB) in accordance with one or more techniques of this disclosure.

FIG. 18 is a flowchart of an example method of graphics processing in accordance with one or more techniques of this disclosure.

FIG. 20 is a flowchart of an example method of graphics processing in accordance with one or more techniques of this disclosure.

DETAILED DESCRIPTION

Figure 1:
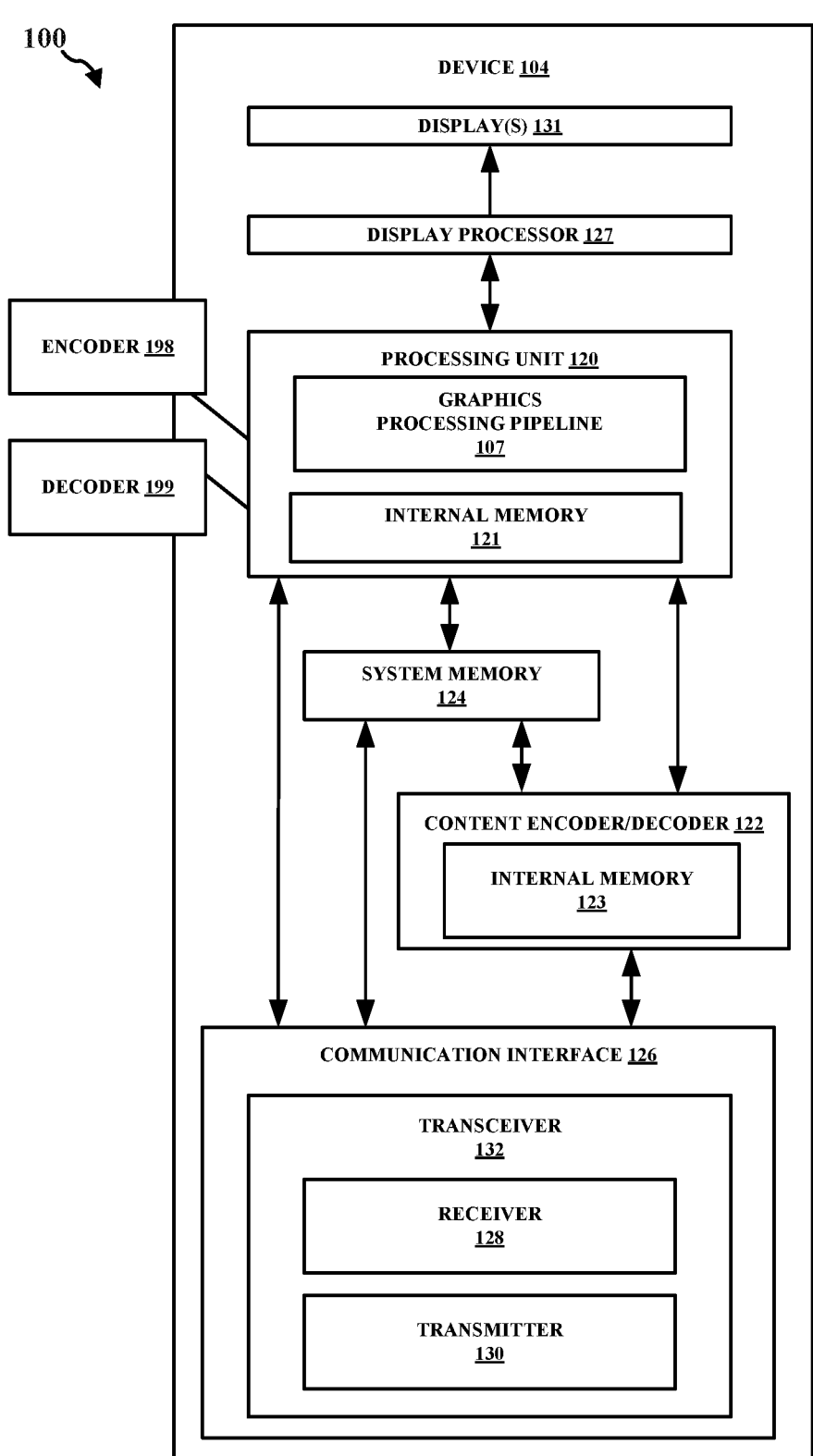
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Some image compression schemes (e.g., Joint Photographic Experts Group eXtra Small (JPEG XS), such as JPEG XS High Profile 420.12, JPEG XS High Profile 444.12, JPEG XS High Profile 4444.12) may not be suitable for wireless streaming of high-resolution images between two wireless devices in a high-performance, low-latency, and energy efficient manner. In an example, some image compression schemes may allow for accurate reproduction of an image that is streamed across wireless devices, but such image compression schemes may be associated with relatively high latency, which may affect user experience, such as when the images are from a video game. In another example, some image compression schemes may allow for streaming of an image in a manner associated with relatively low-latency, but such image compression schemes may not enable the image to be accurately reconstructed at a receiving device.

Various techniques pertaining to a high-performance, low-latency, and energy efficient wavelet-based image compression scheme on a wirelessly-connected pair of SOCs with heterogenous cores are described herein. In an example, a first device (e.g., a first wireless device) generates, in a single pass for each of a plurality of horizontal and vertical divisions of an image frame, a set of wavelet coefficients for the image frame based on a discrete wavelet transform (DWT). The first device selects a set of bits associated with the set of wavelet coefficients to remove based on an entropy coding process. The first device serializes the set of wavelet coefficients, where the set of serialized wavelet coefficients do not include the set of bits. The first device outputs, for a second device, a bitstream including the set of serialized wavelet coefficients. In another example, a second device (e.g., a second wireless device) obtains a bitstream associated with an image frame associated with a first device, where the bitstream includes a set of serialized wavelet coefficients associated with the image frame. The second device deserializes the set of serialized wavelet coefficients, where the set of deserialized wavelet coefficients includes a set of additional bits corresponding to a set of wavelet coefficients associated with the set of serialized wavelet coefficients. The second device reconstructs, in a single pass for each of a plurality of horizontal and vertical divisions of the image frame, the image frame based on the set of deserialized wavelet coefficients based on an inverse discrete wavelet transform (iDWT). The second device outputs an indication of the reconstructed image frame. Vis-à-vis the aforementioned techniques, wireless streaming of high-resolution images between two wireless devices may be achieved in a high-performance and low-latency manner. Furthermore, the aforementioned techniques may be performed without dedicated hardware blocks. In some aspects, a wavelet-based encoder/decoder is described herein that is associated with JPEG XS, but that has reduced computational costs compared to computational costs associated with JPEG XS. Example differences between the encoder/decoder described herein and a JPEG XS encoder/decoder may include fewer bits of storage per component, 16-bit integer math (as opposed to 32-bit integer math), single-pass wavelet formulas, using a single most significant bit (MSB) coding method, and using different band-to-precinct mappings.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include an encoder 198 configured to generate, in a single pass for each of a plurality of horizontal and vertical divisions of an image frame, a set of wavelet coefficients for the image frame based on a discrete wavelet transform (DWT); select a set of bits associated with the set of wavelet coefficients to remove based on an entropy coding process; serialize the set of wavelet coefficients, where the set of serialized wavelet coefficients do not include the set of bits; and output, for a second device, a bitstream including the set of serialized wavelet coefficients. In certain aspects, the processing unit 120 may include a decoder 199 configured to obtain a bitstream associated with an image frame associated with a first device, where the bitstream includes a set of serialized wavelet coefficients associated with the image frame; deserialize the set of serialized wavelet coefficients, where the set of deserialized wavelet coefficients includes a set of additional bits corresponding to a set of wavelet coefficients associated with the set of serialized wavelet coefficients; reconstruct, in a single pass for each of a plurality of horizontal and vertical divisions of the image frame, the image frame based on the set of deserialized wavelet coefficients based on an inverse discrete wavelet transform (iDWT); and output an indication of the reconstructed image frame. Although the following description may be focused on graphics processing, the concepts described herein may be applicable to other similar processing techniques. In one aspect, the encoder 198 and/or the decoder 199 may be or include the content encoder/decoder 122.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
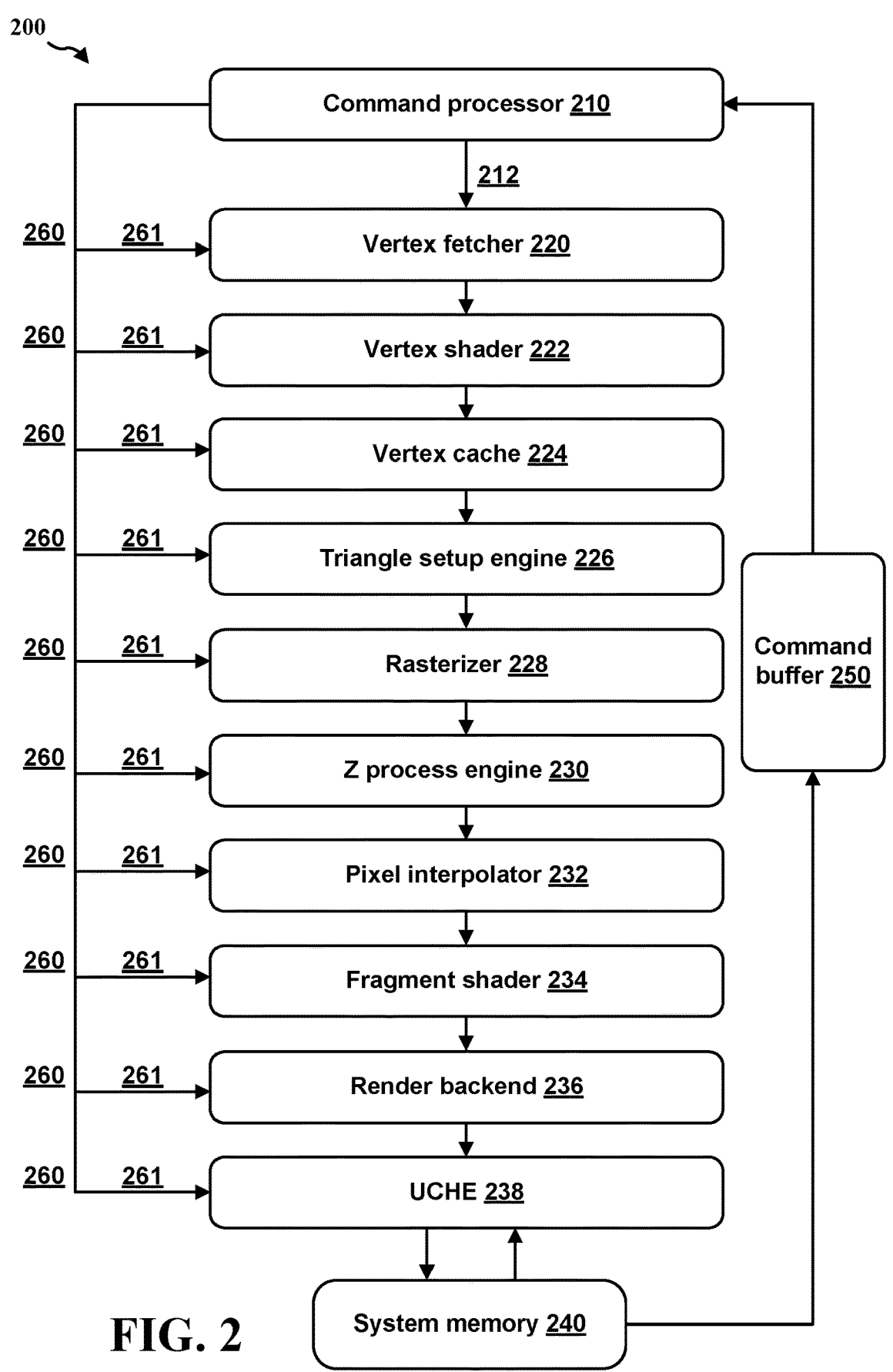
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
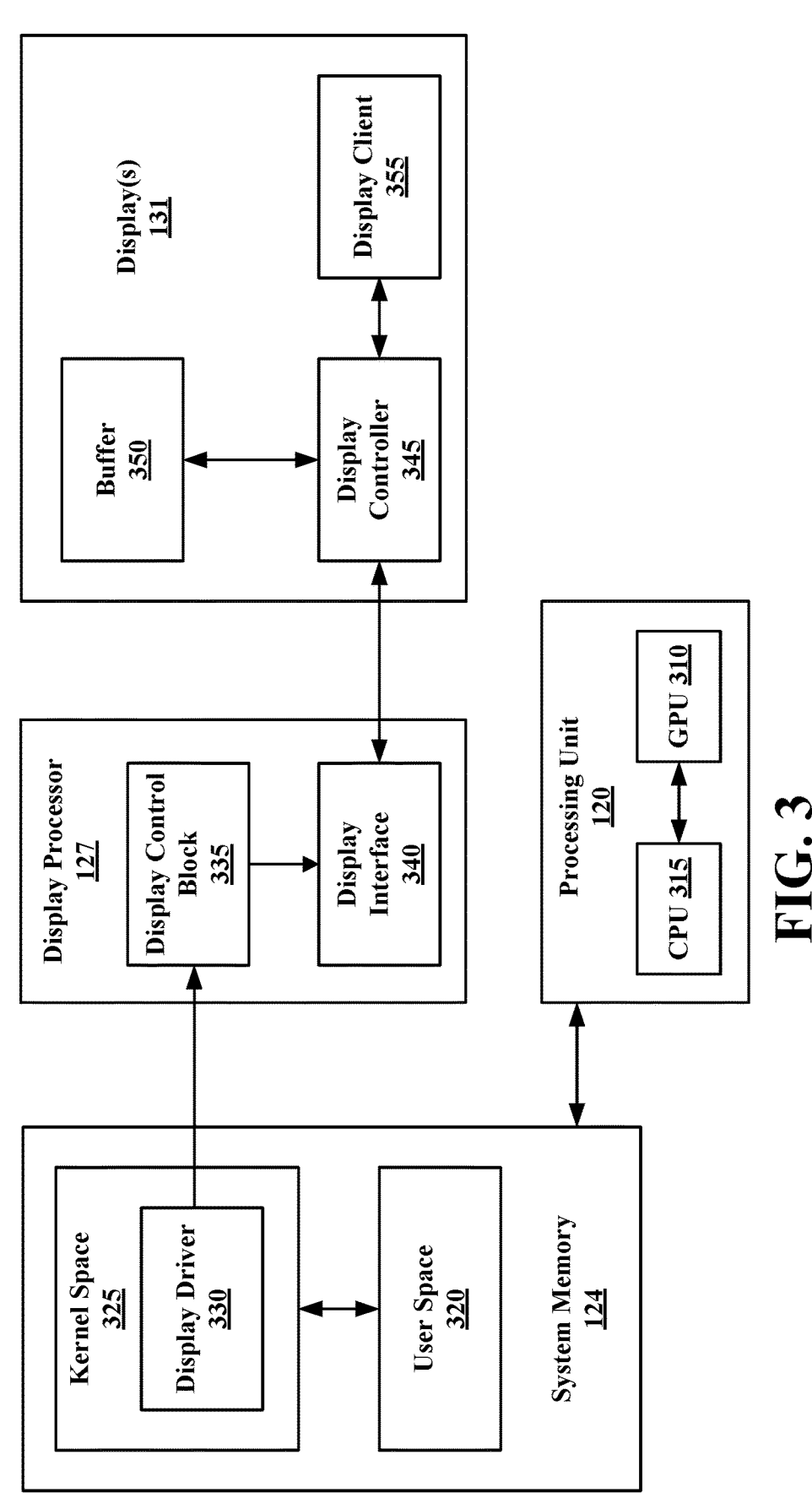
FIG. 3 illustrates an example display framework including a display processor and a display in accordance with one or more techniques of this disclosure.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
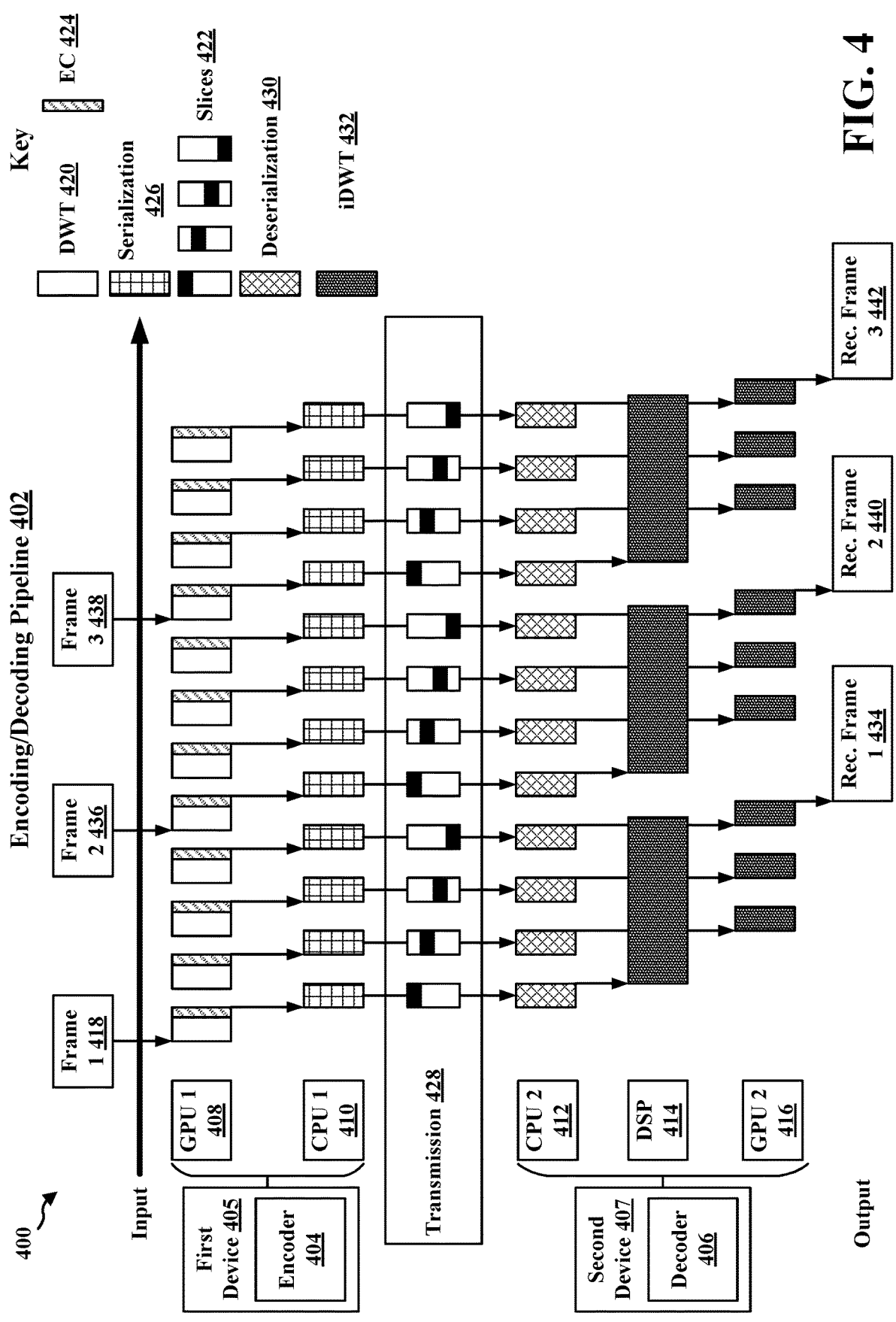
FIG. 4 is a diagram illustrating an encoding/decoding pipeline in accordance with one or more techniques of this disclosure.

FIG. 4 is a diagram 400 illustrating an encoding/decoding pipeline 402 in accordance with one or more techniques of this disclosure. The encoding/decoding pipeline 402 may facilitate wireless streaming of high-resolution images between two wireless devices in a high-performance, low-latency, and energy efficient manner. The encoding/decoding pipeline 402 may include an encoder 404 and a decoder 406. In an example, the encoder 404 may be or include a first device 405 (e.g., a first wireless device) and the decoder 406 may be or include a second device 407 (e.g., a second wireless device). In an example, the first device 405 and/or the second device 407 may be the device 104. In an example, the first device 405 may be a video game console and the second device 407 may be a smartphone. In another example, the first device 405 may be a first video game console (e.g., a stationary video game console) and the second device 407 may be a second video game console (e.g., a handheld video game console), where the first video game console may have first computational capabilities and where the second video game console may have second computational capabilities, where the first computational capabilities may be greater than the second computational capabilities. For instance, the first video game console may be capable of rendering graphical content at higher frame rates, higher resolutions, etc. compared to graphical content rendered by the second video game console. In another example, the first device 405 may be a smartphone and the second device 407 may be an extended reality (XR) headset, such as an augmented reality (AR) headset, a mixed reality (MR) headset, or a virtual reality (VR) headset. In a further example, the first device 405 may be a server and the second device 407 may be a handheld video game console. The first device 405 and the second device 407 may communicate with one another over a wired connection and/or a wireless connection. In an example, the wired connection may be or include an Ethernet connection and/or a universal serial bus (USB) connection. In an example, the wireless connection may be or include a 5G New Radio (NR) connection, a Bluetooth™ (Bluetooth is a trademark of the Bluetooth Special Interest Group (SIG)) connection, and/or a wireless local area network (WLAN) connection, such as a Wi-Fi™ (Wi-Fi is a trademark of the Wi-Fi Alliance) connection based on the Institute of Electrical and Electronics Engineers (IEEE) 802.11 standard.

The encoder 404 may include a first GPU 408 and/or a first CPU 410. The decoder 406 may include a second CPU 412, a digital signal processor (DSP) 414, and/or a second GPU 416. A digital signal processor (DSP) may refer to a specialized microprocessor chip with an architecture designed for operational characteristics of digital signal processing. In an example, the DSP 414 may be configured to perform an inverse discrete wavelet transform (iDWT). Although not depicted in FIG. 4, the encoder 404 may also include a DSP.

The encoder 404 may obtain (e.g., receive) a first frame 418. In an example, the first GPU 408 and/or the first CPU 410 may render the first frame 418. As used herein, the term frame may refer to a single image in a series of consecutive images that are to be displayed on a display panel. In an example, the first frame 418 may be a frame of a video game application.

The first GPU 408 of the encoder 404 may perform a discrete wavelet transform (DWT) 420 on the first frame 418. A DWT may refer to a wavelet transform in which wavelets are discretely sampled. Unlike other types of transforms (e.g., Fourier transforms) which capture frequency, a DWT may capture both frequency and location information (i.e., location in time). A DWT may decompose a signal (e.g., a signal associated with an image) into wavelets. The wavelets may be obtained from a single prototype wavelet by scaling the single prototype wavelet according to a scaling parameter and shifting the single prototype wavelet according to a shifting parameter. Wavelets may refer to a set of basis functions used to transform data (e.g., pixels in the first frame 418). In one aspect, the first GPU 408 (or the first CPU 410) may divide the first frame 418 into slices 422 (e.g., four slices) and the first GPU 408 may perform the DWT 420 on each of the slices 422 independently and/or in parallel. A slice may refer to a division of a frame. In an example, the slices 422 may be horizontal slices. In another example, the slices 422 may be vertical slices. The output of the DWT may be a set of wavelet coefficients. A wavelet coefficient may refer to a convolution of data (e.g., pixel values) with a wavelet base.

The first GPU 408 of the encoder 404 may perform an entropy coding (EC) 424 on an output of the DWT 420. For instance, the first GPU 408 may perform the EC 424 independently and/or in parallel on an output of the DWT 420 for each of the slices 422. EC (which may also be referred to as an entropy coding process or an entropy encoding process) may refer to a lossless data compression method that attempts to approach a lower bound declared by Shannon's source coding theorem, which states that a lossless data compression method may have an expected code length greater than or equal to an entropy of a source. The EC 424 may calculate a number of bits associated with the first frame 418 (e.g., bits associated with the output of the DWT 420) that are to be truncated (i.e., removed) as part of a compression process. Truncating the numbers of bits may be associated with a lossy compression scheme.

The first CPU 410 of the encoder 404 may perform a serialization 426 on an output of the EC 424. For instance, the first CPU 410 may perform the serialization 426 independently and/or in parallel on an output of the EC 424 for each of the slices 422. Serialization may refer to a process of translating data (e.g., an output of the EC 424) into a format (e.g., a series of bytes) that can be stored or transmitted. The serialization 426 may include truncating the number of bits as calculated by the EC 424.

At 428, the encoder 404 may transmit an output of the serialization 426 to the decoder 406 over the wired connection and/or the wireless connection. For instance, the encoder 404 may transmit the output of the serialization 426 for each of the slices 422 independently and/or in parallel. In an example, transmitting the output of the serialization 426 may include generating a bitstream. A bitstream may refer to a sequence of bits. In one aspect, the encoder 404 may send a first packet after a first substream which may enable deserialization to be performed in parallel (explained in greater detail below).

The decoder 406 may obtain the output of the serialization 426 over the wired connection and/or the wireless connection. For instance, the decoder 406 may obtain an output of the serialization 426 for each of the slices 520 independently and/or in parallel.

The second CPU 412 of the decoder 406 perform a deserialization 430 independently and/or in parallel on the output of the serialization 426 over the wired connection and/or the wireless connection. For instance, the second CPU 412 may perform the deserialization 430 on the output of the serialization 426 for each of the slices 422. Deserialization may refer to a process of extracting a data structure from a series of bytes. The deserialization 430 may include adding bits to the output of the serialization 426, where the added bits may correspond to the truncated bits as calculated by the EC 424. An output of the deserialization may include reconstructed wavelet coefficients.

The DSP 414 and/or the second GPU 416 of the decoder 406 may perform an inverse discrete wavelet transform (iDWT) 432 independently and/or in parallel on an output of the deserialization 430. In an example in which the first frame 418 is divided in to four slices, the DSP 414 may perform the iDWT 432 on a first slice in the four slices and the second GPU 416 may perform the iDWT 432 on a second slice, a third slice, and a fourth slice in the four slices. Other divisions may also be possible. For instance, the DSP 414 may perform the iDWT 432 on the first slice and the second slice and the second GPU 416 may perform the iDWT 432 on the third slice and the fourth slice. An inverse discrete wavelet transform (iDWT) may refer to an inverse of a DWT. The iDWT 432 may generate a first reconstructed frame 434, where the first reconstructed frame 434 may correspond to (i.e., be a version of) the first frame 418. In an example, a time between the encoder 404 obtaining the frame and the decoder 406 generating the first reconstructed frame 434 may be around 13.8 ms plus additional time that may depend on an input from a bridge chip source, a time for wireless transmission, and a time for display and vertical synchronization (vsync). The first reconstructed frame 434 may be presented on a display panel.

The encoder 404 and the decoder 406 may perform processes similar to those described above on a second frame 436 and a third frame 438 in order to generate a second reconstructed frame 440 and a third reconstructed frame 442, respectively. The first reconstructed frame 434, the second reconstructed frame 440, and the third reconstructed frame 442 may be presented sequentially on the display panel as part of video content.

Figure 5:
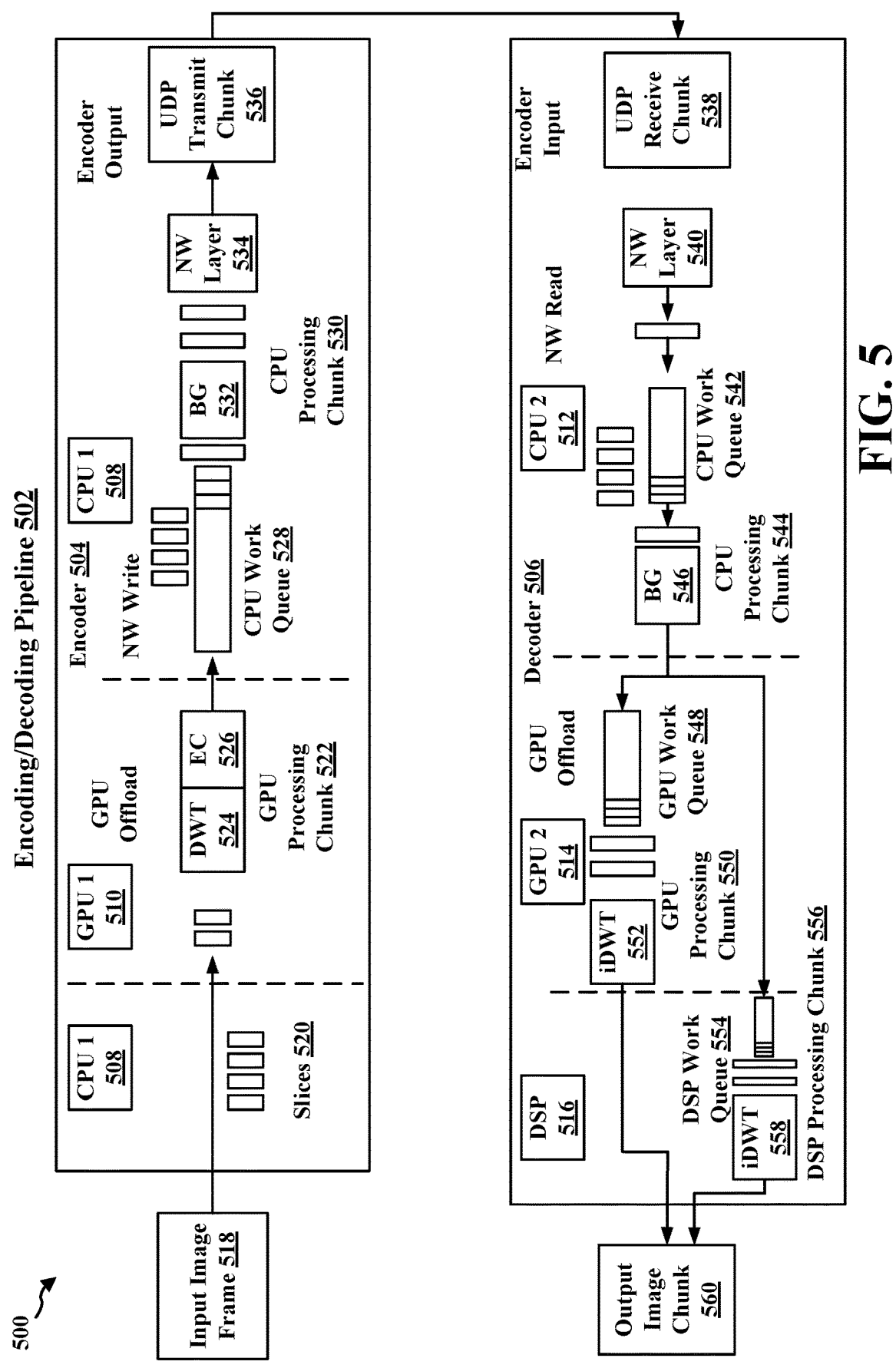
FIG. 5 is a diagram illustrating an encoding/decoding pipeline in accordance with one or more techniques of this disclosure.

FIG. 5 is a diagram 500 illustrating an encoding/decoding pipeline 502 in accordance with one or more techniques of this disclosure. The encoding/decoding pipeline 502 may be or include the encoding/decoding pipeline 402. The encoding/decoding pipeline 502 may be or include an encoder 504 and a decoder 506. In an example, the encoder 504 may be or include the encoder 404. In an example, the decoder 506 may be or include the decoder 406. The encoder 504 may include a first CPU 508 and a first GPU 510. The encoder 504 may also include a DSP (not depicted in FIG. 5). The decoder 506 may include a second CPU 512, a second GPU 514, and a DSP 516.

The encoder 504 may obtain an input image frame 518. The first CPU 508 may divide the input image frame 518 into slices 520. A GPU processing chunk 522 may perform a DWT 524 and an EC 526 on each of the slices 520. An output of the GPU processing chunk 522 may be placed in a CPU work queue 528 of the first CPU 508. A CPU processing chunk 530 may perform a bitstream generation (BG) 532 on the output in the CPU work queue 528. A network layer 534 associated with the first CPU 508 may generate a user datagram protocol (UDP) transmit chunk 536 based on the BG 532. The encoder 504 may transmit the UDP transmit chunk 536 to the decoder 506.

The decoder 506 may receive a UDP receive chunk 538, where the UDP receive chunk 538 may be or include the UDP transmit chunk 536. A network layer 540 associated with the second CPU 512 may place the UDP receive chunk 538 into a CPU work queue 542 of the second CPU 512. A CPU processing chunk 544 of the second CPU 512 may perform a BG 546 on the UDP receive chunk 538 (or a portion thereof) in the CPU work queue 542. An output of the BG 546 may be placed in a GPU work queue 548 of the second GPU 514. A GPU processing chunk 550 of the second GPU 514 may perform an iDWT 552 on the output of the BG 546 in the GPU work queue 548. An output of the BG 546 may also be placed in a DSP work queue 554 of the DSP 516. A DSP processing chunk 556 of the DSP 516 may perform an iDWT 558 on the output of the BG 546 in the DSP work queue 554. Outputs of the iDWT 552 and the iDWT 558 may be combined to generate an output image chunk 560. The output image chunk 560 may correspond to the first reconstructed frame 434. The output image chunk 560 may be presented on a display panel.

Figure 6:
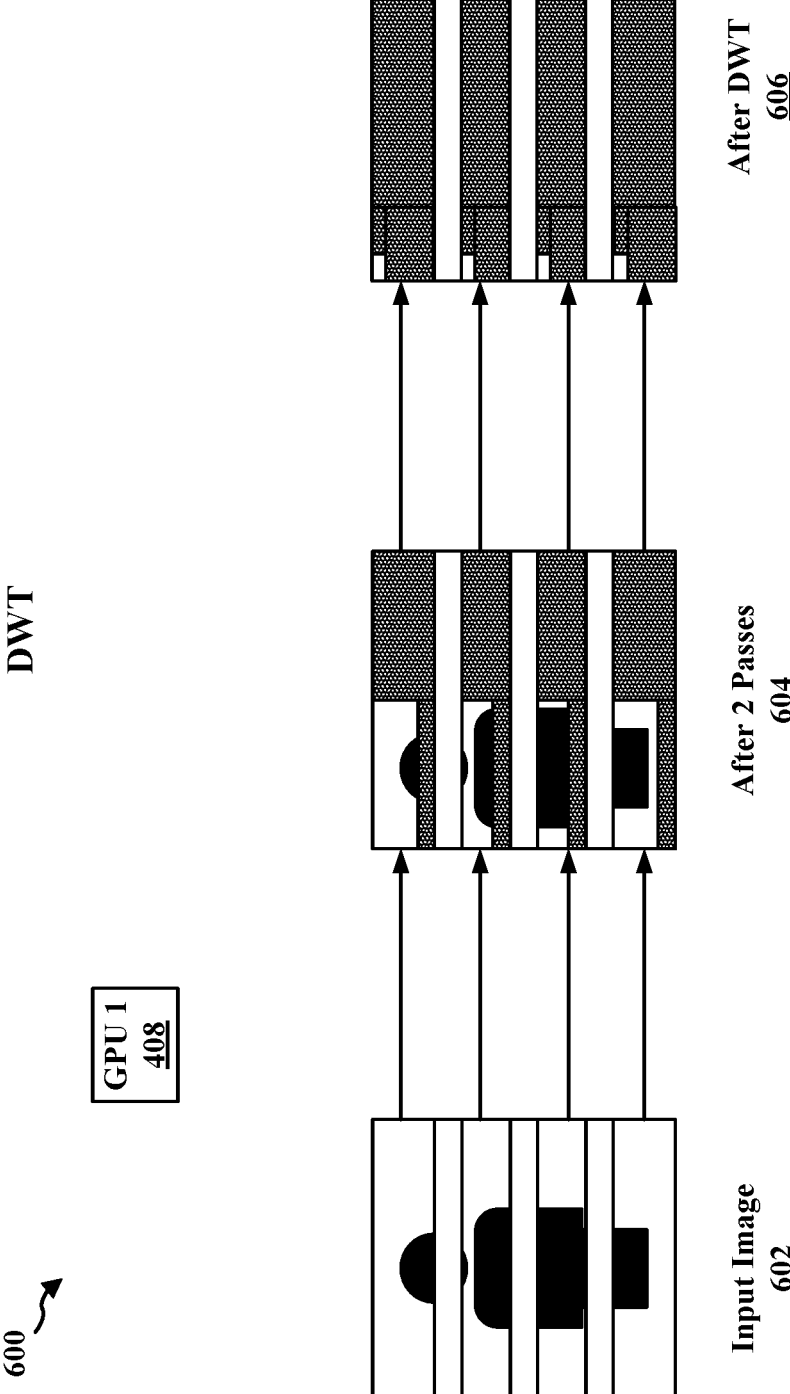
FIG. 6 is a diagram illustrating example aspects of a discrete wavelet transform (DWT) in accordance with one or more techniques of this disclosure.

FIG. 6 is a diagram 600 illustrating example aspects of a discrete wavelet transform (DWT) in accordance with one or more techniques of this disclosure. The example aspects of the DWT may correspond to and/or be included in the DWT 420. The example aspects of the DWT may be performed by and/or may be associated with the first GPU 408.

The first GPU 408 may obtain an input image 602, where the input image 602 may be divided into four slices. A compute shader of the first GPU 408 may convert the input image 602 from a red green blue (RGB) format to a luminance blue projection red projection (YUV) format. An RGB format may refer to a format of representing color in which red, green, and blue primary colors of light are added together to reproduce colors. A YUV format may refer to a format of representing color that takes human perception into account, allowing for reduced bandwidth for chrominance components compared to an RGB format. The computer shader may also perform the DWT in separate vertical and separate horizontal passes. A compute shader may refer to a general purpose shader that may compute arbitrary information (e.g., graphical data, non-graphical data, etc.).

The first GPU 408 may utilize LeGall 5/3 wavelet functions in high profile to perform the DWT, where "5" may refer to five vertical decomposition levels of the DWT and where "3" may refer to three horizontal decomposition levels of the DWT. The JPEG XS standard may also utilize LeGall 5/3 wavelet functions. The JPEG XS standard may refer to an interoperable, visually lossless, low-latency and lightweight image and video coding system that targets mezzanine compression within an audiovisual (AV) application.

As noted above, the compute shader of the first GPU 408 may perform the DWT in separate vertical and separate horizontal passes. The diagram 600 depicts a view of the input image 602 after two passes 604 (one horizontal pass and one vertical pass). As will be described in greater detail below, a DWT for an image may include 5 horizontal passes and 3 vertical passes. To generate wavelet coefficients for a vertical line (corresponding to a horizontal pass) or for a vertical line (corresponding to a vertical pass), the wavelet coefficients may be loaded and stored once while performing high frequency and low frequency computation. Stated differently, the DWT may include multiple passes (e.g., 5 horizontal passes and 3 vertical passes), but the generation of wavelet coefficients may occur in a single pass within each of the multiple passes. The diagram 600 also depicts a view of the input image 602 after DWT completion 606. The compute shader of the first GPU 408 may perform the DWT separately for each slice (i.e., each chunk) in the four slices (i.e., the four chunks) in order to facilitate parallelism with a CPU (e.g., the first CPU 410). An encoder (e.g., the encoder 404) may select a number of slices that the input image 602 is to be divided into so as to increase parallelism with the CPU. In an example, the number of slices is four. In one example, if the encoder selects too large of a number of slices, there may be increased software overhead and there may be relatively small GPU dispatches. In another example, if the encoder selects too few of a number of slices, there may not be a suitable overlap with the CPU so as to facilitate parallelism.

Figure 7:
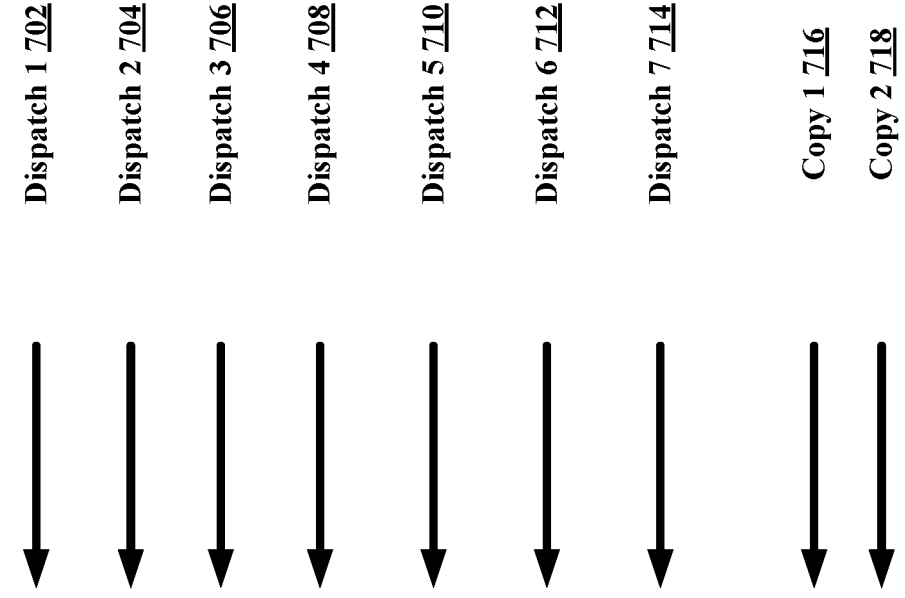
FIG. 7 is a diagram illustrating further example aspects of a DWT in accordance with one or more techniques of this disclosure.

FIG. 7 is a diagram 700 illustrating further example aspects of a discrete wavelet transform (DWT) in accordance with one or more techniques of this disclosure. The example aspects of the DWT may correspond to and/or be included in the DWT 420. The example aspects of the DWT may be performed by and/or may be associated with the first GPU 408.

The first GPU 408 may perform the DWT via dispatches (e.g., a first dispatch 702, a second dispatch 704, a third dispatch 706, a fourth dispatch 708, a fifth dispatch 710, a sixth dispatch 712, and a seventh dispatch 714) and copy operations (e.g., a first copy 716 and a second copy 718). In an example, the first GPU 408 may compute a threadgroup size of 128×4. The first dispatch 702 and the second dispatch 704 may operate on a full chunk/slice (2560*360 pixels). Subsequent pairs of dispatches (e.g., pairs of the third dispatch 706, the fourth dispatch 708, the fifth dispatch 710, the sixth dispatch 712, and the seventh dispatch 714) may operate on 25% of pixels of a previous pair.

The DWT performed by the first GPU 408 may differ from a DWT performed as part of the JPEG XS standard in the following aspects. First, the DWT performed by the first GPU 408 may utilize 10 bits of storage per YUV component. In contrast, the DWT performed as part of the JPEG XS standard may utilize 20 bits of storage (20 bits of storage may be a nominal precision of wavelet coefficients associated with the DWT). Second, the DWT performed by the first GPU 408 may utilize 16-bit integer math (i.e., 16-bit precision computation). In contrast, the DWT performed as part of the JPEG XS standard may utilize 32-bit integer math. Third, the DWT performed by the first GPU 408 may not perform an initial scaling of an input image to 20 bits. In contrast, the DWT performed as part of the JPEG XS standard may scale an input image to 20 bits. Fourth, the DWT performed by the first GPU 408 may not perform a direct current (DC) input level shift. A DC input level shift may refer to changing a mean amplitude of a waveform. In contrast, the DWT performed as part of the JPEG XS standard may perform a DC input level shift to achieve a DC level of zero in an input signal.

Figure 8:
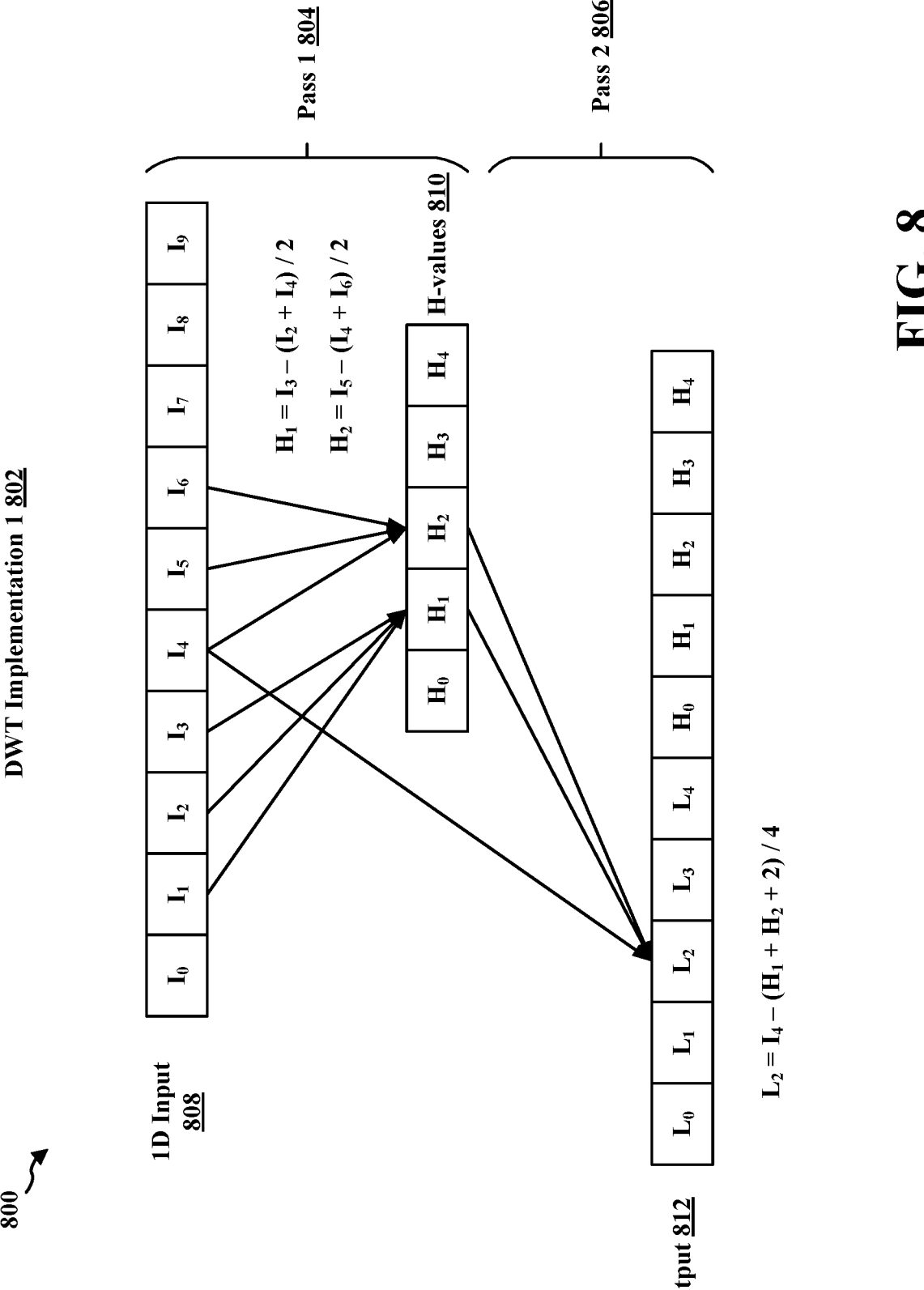
FIG. 8 is a diagram illustrating an example of a first DWT implementation in accordance with one or more techniques of this disclosure.

FIG. 8 is a diagram 800 illustrating an example of a first DWT implementation 802 in accordance with one or more techniques of this disclosure. The first DWT implementation 802 may be associated with the DWT 420. The first DWT implementation 802 may calculate high-pass and low-pass wavelet coefficients as two separate execution passes over output data from a previous pass.

In accordance with the first DWT implementation 802, a GPU (e.g., the first GPU 408) may perform a first pass 804 and a second pass 806. The first pass 804 may operate on a one-dimensional (1D) input 808 (e.g., a row or a column of pixels in an input image, such as the first frame 418). The 1D input 808 may include pixel values. During the first pass 804, the GPU may compute high frequency values (H-values 810) based on the 1D input 808. The GPU may store the H-values 810 in intermediate memory of the GPU. Storing the H-values 810 in the intermediate memory may be inefficient. With more particularity, an H-value in the H-values 810 may be based on a difference between a first pixel value and a sum of a second pixel value and a third pixel value divided by two, where the first pixel value, the second pixel value, and the third pixel value correspond to a first pixel, a second pixel, and a third pixel in the 1D input 808, and where the first pixel is located adjacent to and between the second pixel and the third pixel. Example calculations for a first H-value $H_1$ and a second H-value $H_2$ are presented below in equation (I) and (II), respectively.

$$H_1 = I_3 - \frac{I_2 - I_4}{2} \tag{I}$$

$$H_2 = I_5 - \frac{I_4 - I_6}{2} \tag{II}$$

The second pass 806 may operate on the 1D input 808 and the H-values 810. During the second pass 806, the GPU may compute low frequency values (i.e., L-values, referred to by "L" in FIG. 8). The output 812 of the second pass 806 may include the H-values 810 and the L-values. The output 812 may be or include a set of wavelet coefficients associated with the H-values 810 and the L-values. An example calculation for $L_2$ in accordance with the first DWT implementation 802 is presented below in equation (III).

$$L_2 = I_4 - \frac{H_1 + H_2 + 2}{4} \tag{III}$$

Figure 9:
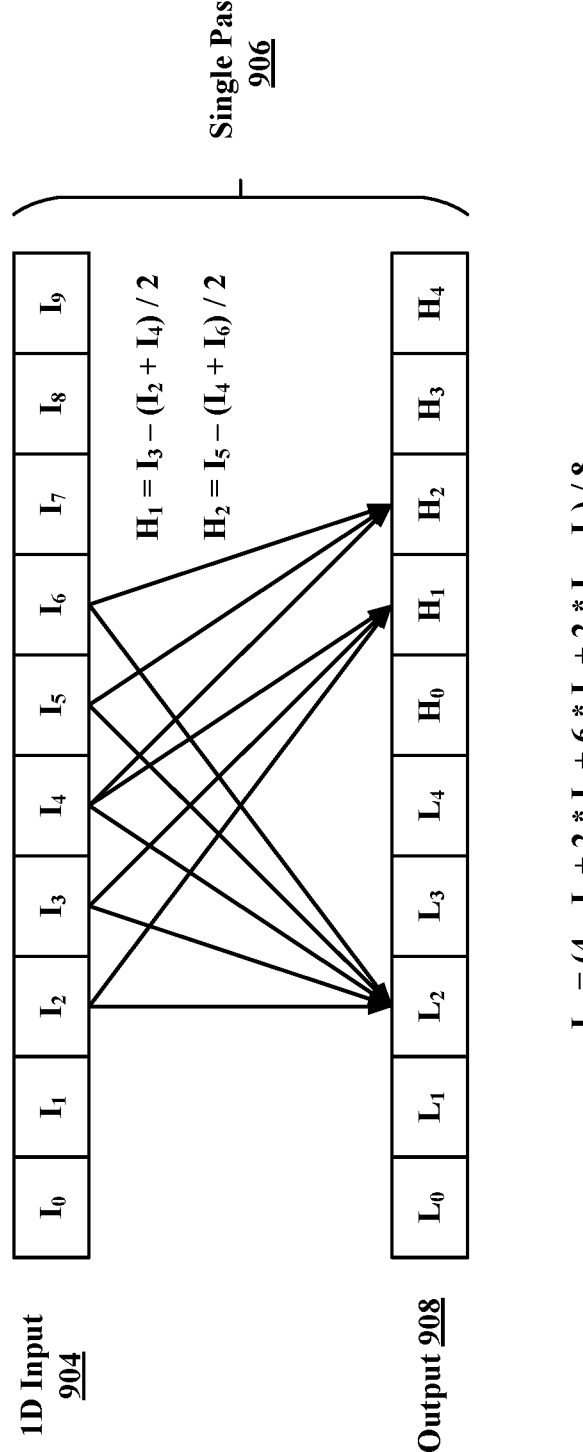
FIG. 9 is a diagram illustrating an example of a second DWT implementation in accordance with one or more techniques of this disclosure.

FIG. 9 is a diagram 900 illustrating an example of a second DWT implementation 902 in accordance with one or more techniques of this disclosure. The second DWT implementation 902 may be associated with the DWT 420. The second DWT implementation 902 may be a single-pass algorithm that does not utilize intermediate storage, and hence the second DWT implementation 902 may be more efficient than the first DWT implementation 802.

In accordance with the second DWT implementation 902, a GPU (e.g., the first GPU 408) may perform a single pass 906. The single pass 906 may operate on a one-dimensional (1D) input 904 (e.g., a row or a column of pixels in an input image, such as the first frame 418). The 1D input 904 may include pixel values. The GPU may compute H-values in a manner similar to that described above in the description of the first DWT implementation 802. However, unlike the first DWT implementation 802, the second DWT implementation 902 may compute L-values based on the 1D input 904 (and not based on the H-values), that is, computation of the L-values may be independent from computation of the H-values. An example calculation for $L_2$ in accordance with the second DWT implementation 902 is presented below in equation (IV).

$$L_2 = \frac{4 - I_2 + 2 * I_3 + 6 * I_4 + 2 * I_5 - I_6}{8} \tag{IV}$$

An output 908 of the single pass 906 may include the H-values and the L-values. The output 908 may be or include a set of wavelet coefficients associated with the H-values and the L-values.

FIG. 10 is a diagram 1000 illustrating an example entropy coding implementation 1002 in accordance with one or more techniques of this disclosure. The entropy coding implementation 1002 may be performed by the first GPU 408. The entropy coding implementation 1002 may be included in and/or may correspond to the EC 424. The entropy coding implementation 1002 may be implemented in a compute shader.

In general, entropy coding (e.g., the entropy coding implementation 1002) may analyze wavelet coefficients in order to calculate a number of bits that may be truncated (i.e., removed) from bits associated with the wavelet coefficients. The entropy coding implementation 1002 may be implemented in a single compute shader at the first GPU 408. The entropy coding implementation 1002 may partition a wavelet texture (i.e., an output of a DWT, such as the second DWT implementation 902) into precincts, where each precinct may include a number of horizontal lines in an image. The example described in relation to the entropy coding implementation 1002 defines a precinct as being four horizontal lines; however, it is to be understood that a precinct may include a different number of horizontal lines (e.g., two, eight, etc.). Each precinct may be allocated a budget. The entropy coding implementation 1002 may remove bits from the wavelet coefficients until a precinct "fits" within its budget. In one aspect, each precinct may have an assigned weight, where the weight is based on an importance of the precinct. For instance, some precincts may correspond to an area of an image that includes more important data, and hence some precincts may be assigned a relatively higher weight in comparison to a precinct that includes less important data. In an example, the entropy coding implementation 1002 may produce frame sizes that range from 1.1-1.2 megabytes (MB), such as 1.12 MB, 1.15 MB, 1.18 MB, etc. The entropy coding implementation 1002 may include/accommodate a wavelet coefficient texture-to-buffer in preparation for CPU serialization.

The entropy coding implementation 1002 may differ from an entropy coding performed as part of the JPEG XS standard in the following aspects. First, in the entropy coding implementation 1002 an exhaustive search over possible coding techniques may not be performed. In contrast, entropy coding performed as part of the JPEG XS standard may include an exhaustive search over possible coding techniques in order to optimize for a maximum compression ratio. Second, in the entropy coding implementation 1002, a single most significant bit (MSB) coding method may be utilized. In contrast, the JPEG XS standard may utilize different MSB coding methods. Third, in the entropy coding implementation 1002, a refinement step may not be utilized. In contrast, the JPEG XS standard may involve calculating multiple candidate scenario values per precinct with a refinement step. Fourth, the entropy coding implementation 1002 may include different band-to-precinct mappings compared to band-to-precinct mappings in entropy coding associated with the JPEG XS standard. For instance, in the entropy coding implementation 1002, precincts may be filled with wavelet coefficients that are adjacent in an image space (i.e., each precinct may effectively be a horizontal strip of an image after a DWT is performed), whereas in the JPEG XS standard, precincts may be built by copying wavelet coefficients from different wavelet bands. Fifth, the entropy coding implementation 1002 may not utilize vertical prediction. In contrast, the JPEG XS standard may utilize vertical prediction as part of an entropy coding process.

The entropy coding implementation 1002 may operate on an input texture 1004, where the input texture 1004 may include and/or may be associated with wavelet coefficients 1006, where the wavelet coefficients may be generated by a DWT (e.g., the DWT 420). The input texture 1004 may correspond to an image (e.g., the first frame 418). At 1008, the first GPU 408 may partition the input texture 1004 (and hence, the wavelet coefficients 1006) into precincts. At 1010, the first GPU 408 may partition each precinct in the precincts into columns (e.g., 20 columns) of wavelet coefficients. At 1012, the first GPU 408 may iterate over the columns of each precinct in order to form coding groups. At 1014, the first GPU 408 may convert each coding group from a sign representation to a sign plus magnitude representation. At 1016, the first GPU 408 may calculate an MSB of each coding group. At 1018, the first GPU 408 may iterate over valid scenarios in order to calculate a number of truncation bits (i.e., bits that are to be removed). At 1020, the first GPU 408 may accumulate footprints of all coding groups in a precinct. At 1022, the first GPU 408 may find a maximum footprint that fits a budget for a precinct. At 1024, the first GPU 408 may write scenario values to memory. Particular aspects of the entropy coding implementation 1002 will be described in greater detail below.

Figure 11:
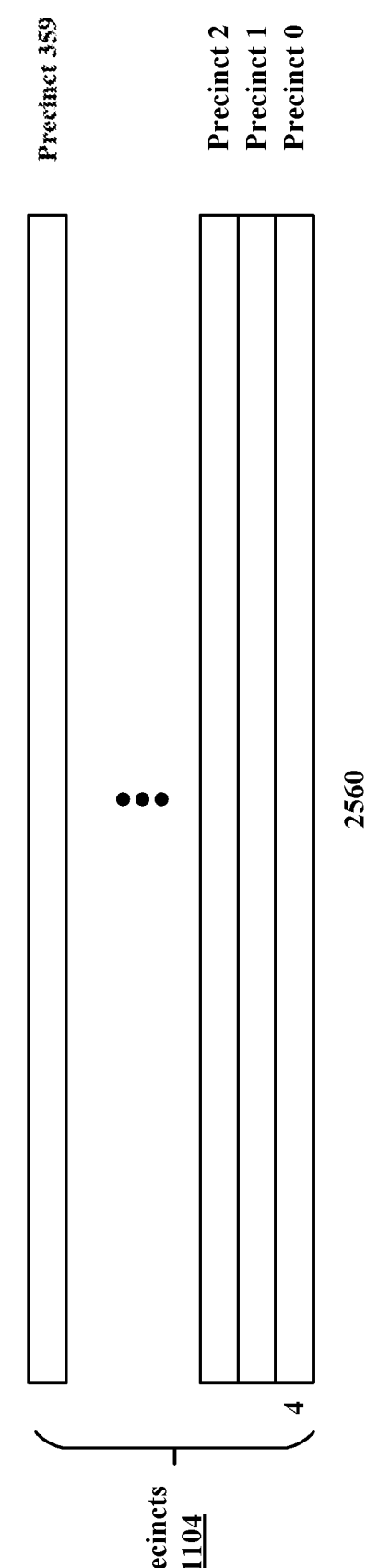
FIG. 11 is a diagram illustrating an example of partitioning an input texture into precincts in accordance with one or more techniques of this disclosure.

FIG. 11 is a diagram 1100 illustrating an example 1102 of partitioning an input texture into precincts 1104 in accordance with one or more techniques of this disclosure. The example 1102 may correspond to 1008 in FIG. 10. As indicated above, the first GPU 408 may partition the input texture 1004 into precincts 1104. Three wavelet coefficients may be assigned to each pixel associated with the texture. A precinct may correspond to four horizontal lines and 2560 vertical lines in an input image associated with the input texture 1004. The first GPU 408 may assign one work group (having a size of 128×4) to each precinct in the precincts 1104. In an example, the first GPU 408 may divide the input texture 1004 into 360 precincts.

Figure 12:
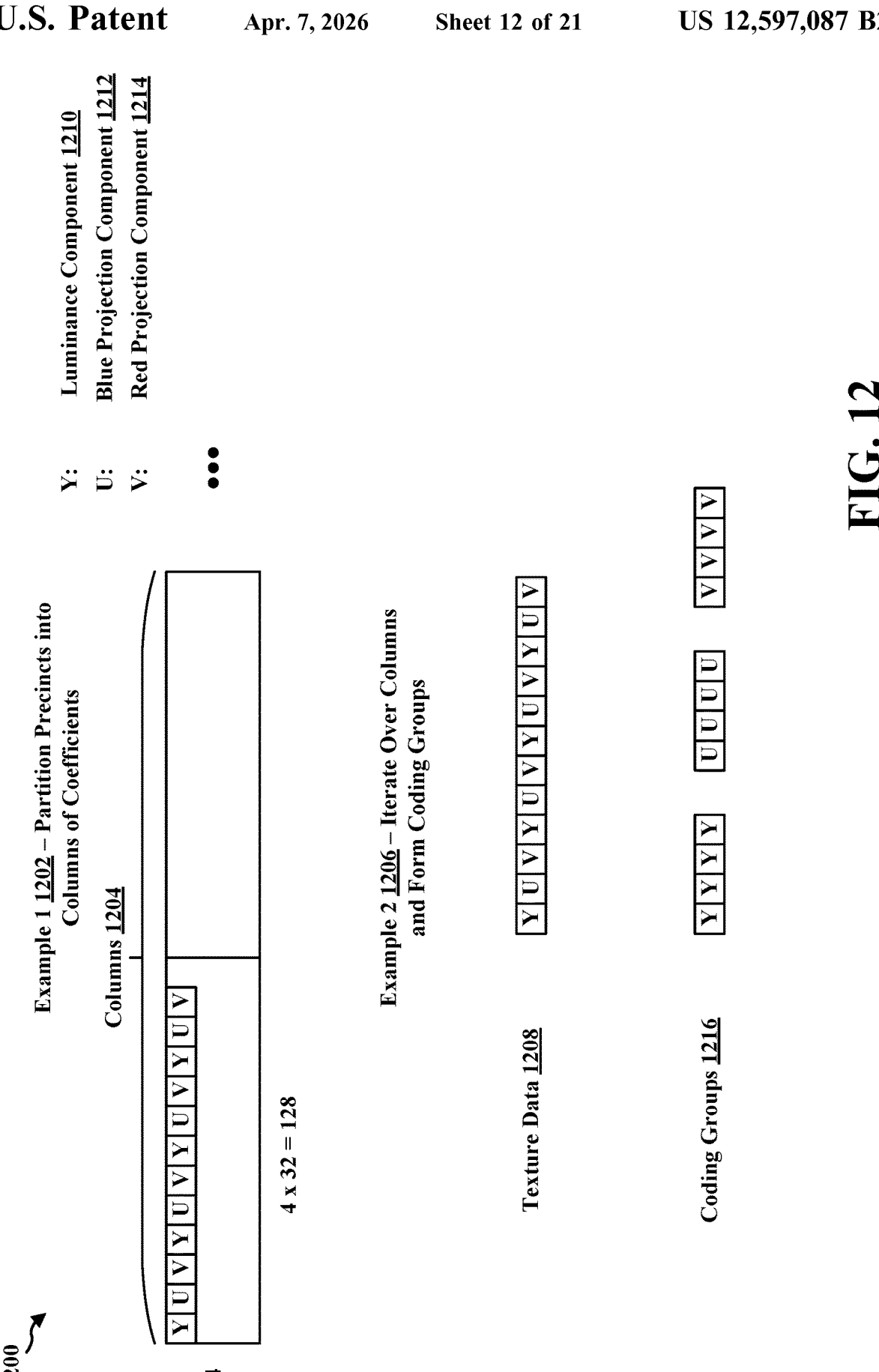
FIG. 12 is a diagram illustrating examples of partitioning precincts into columns of coefficients and forming coding groups in accordance with one or more techniques of this disclosure.

FIG. 12 is a diagram 1200 illustrating examples of partitioning precincts into columns of coefficients and forming coding groups in accordance with one or more techniques of this disclosure. The diagram 1200 depicts a first example 1202 of partitioning a precinct in the precincts 1104 into columns 1204 (e.g., 20 columns) of wavelet coefficients. The first example 1202 may correspond to 1010 in FIG. 10.

The diagram 1200 also depicts a second example 1206 of iterating over columns and forming coding groups. The second example 1206 may correspond to 1012 in FIG. 10. The first GPU 408 may process texture data 1208 (e.g., the input texture 1004), where the texture data 1208 may include Y components 1210, U components 1212, and V components 1214 from a YUV color space. The first GPU 408 may iterate over the columns 1204 and form coding groups 1216. A coding group may refer to four adjacent wavelet coefficients from the same components (e.g., four Y components, four U components, or four V components).

FIG. 13 is a diagram 1300 illustrating examples of converting to a sign and magnitude representation and calculating a most significant bit (MSB) in accordance with one or more techniques of this disclosure. The diagram 1300 depicts a first example 1302 of converting wavelet coefficients from a signed integer representation to a sign and magnitude representation. The first example 1302 may correspond to 1014 in FIG. 10. A coding group 1304 in the coding groups 1216 may include four Y components: $Y_1$, $Y_2$, $Y_3$, and $Y_4$, where each of the Y components is in a signed integer representation (which may also be referred to as two's complement representation). In two's complement representation, a left-most of a bit sequence may be a sign bit. In an example, the bit sequence may represent a positive number when the sign bit is "0" and the bit sequence may represent a negative number when the sign bit is "1." In an example, for the bit sequence "1000," "1" (i.e., the left-most bit) may be the sign bit. In two's complement representation, a negative representation of a number may be created by taking a two's complement representation of the corresponding positive number, flipping the bits (i.e., change "0" bits to "1" bits and "1" bits to "0" bits) and adding the value 1. In an example, the number "+2" may be represented as "0010" in two's complement representation. The number "−2" may be represented as "1110" in two's complement representation.

The first GPU 408 may convert the coding group 1304 to a coding group 1306, where the coding group 1306 may be in a sign and magnitude representation and where the coding group may include four Y components: $Y_1^m$, $Y_2^m$, $Y_3^m$, and $Y_4^m$, where each of the Y components is in a sign and magnitude representation. In a sign and magnitude representation, a left-most bit of a bit sequence may be a sign bit. In an example, the bit sequence may represent a positive number when the sign bit is "0" and the bit sequence may represent a negative number when the sign bit is "1." The remaining bits in the bit sequence may represent a number in binary format. In an example, the number "+2" may be represented as "0010" in sign and magnitude representation and the number "−2" may be represented as "1010" in sign and magnitude representation.

The diagram 1300 also depicts a second example 1308 of calculating an MSB of a coding group (e.g., the coding group 1306). An MSB may refer to a bit in a binary number with a largest value (excluding a sign bit). The second example 1308 may correspond to 1016 in FIG. 10. The first GPU 408 may calculate the MSB of the coding group 1306 according to equation (V) below.

$$MSB=\text{firstbithigh}(Y_0^m|Y_1^m|Y_2^m|Y_3^m) \tag{V}$$

In equation (V), "|" may represent a bitwise OR operation. "Firstbithigh" may return a number of a location of a first non-zero bit in a bit sequence.

Figure 14:
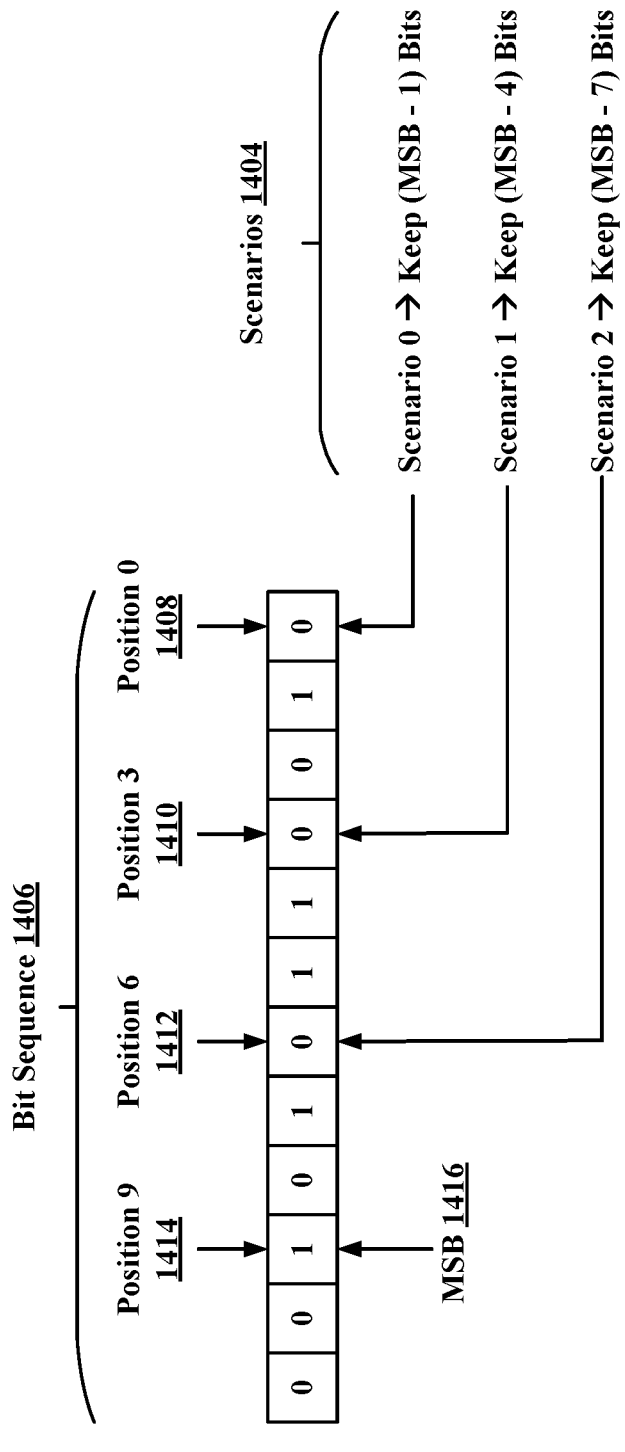
FIG. 14 is a diagram illustrating an example of calculating truncation bits in accordance with one or more techniques of this disclosure.

FIG. 14 is a diagram 1400 illustrating an example 1402 of calculating truncation bits in accordance with one or more techniques of this disclosure. The example 1402 may correspond to 1018 in FIG. 10. The first GPU 408 may iterate over all (valid) scenarios 1404 in order to calculate a number of truncation bits (i.e., a number of bits that are to be truncated). A scenario may refer to a preset that defines a truncation position in a coding group (e.g., the coding group 1306) based on a wavelet band associated with a wavelet coefficient. Iterating over the (valid) scenarios may refer to iterating over truncation positions. A scenario may be valid if (1) a truncation position is not greater than a position of the MSB and (2) a number of bits to be truncated is not greater than a number of bits in a bit sequence.

In an example, a coding group (e.g., the coding group 1306) may be represented by a bit sequence 1406, where the bit sequence 1406 may be "001010110010." An MSB 1416 of the bit sequence 1406 may be located at position 9 1414. There may be three valid scenarios for the bit sequence 1406: scenario 0, scenario 1, and scenario 2. In scenario 0, a truncation position for the bit sequence 1406 may be position 0 1408. If the bit sequence 1406 is truncated according to scenario 0, the first GPU 408 may truncate the bit at position 0 1408 and the first GPU 408 may keep (MSB-1) bits. Thus, the truncated bit sequence corresponding to scenario 0 may be "101011001" (a total of 9 bits). In scenario 1, a truncation position for the bit sequence 1406 may be position 3 1410. If the bit sequence 1406 is truncated according to scenario 1, the first GPU 408 may truncate the bit at position 3 1410 and the first GPU 408 may keep (MSB-4) bits. Thus, the truncated bit sequence corresponding to scenario 1 may be "101011" (a total of 6 bits). In scenario 2, a truncation position for the bit sequence 1406 may be position 6 1412. If the bit sequence 1406 is truncated according to scenario 2, the first GPU 408 may truncate the bit at position 6 1412 and the first GPU 408 may keep (MSB-7) bits. Thus, the truncated bit sequence corresponding to scenario 2 may be "101" (a total of 3 bits).

Referring back to FIG. 10, at 1020, the first GPU 408 may accumulate footprints of all coding groups (e.g., the coding groups 1216) in a precinct (e.g., a precinct in the precincts 1104). In an example, the first GPU 408 may add footprints of all coding groups in a precinct to calculate a total footprint. There may be one total value per scenario. A footprint for a scenario may refer to a number of bits remaining for coding groups in a precinct after truncation according to the scenario.

At 1022, the first GPU 408 may find a maximum footprint that fits a budget. The budget may be determined by a target bitrate. A bitrate (e.g., a target bitrate) may refer to a number of bits that are to be transmitted for a frame. In an example, the target bitrate may be 1.0-2.0 MB per frame, such as 1.5 MB per frame, 1.6 MB per frame, 1.7 MB per frame, etc. The first GPU 408 may select the target bitrate based on various factors, such as network conditions, capabilities of device(s), etc. At 1024, the first GPU 408 may write scenario values to memory. A scenario value for a precinct may refer to the remaining bits for the precinct after truncation. In an example, one scenario value may be written to memory for each precinct.

Figure 15:
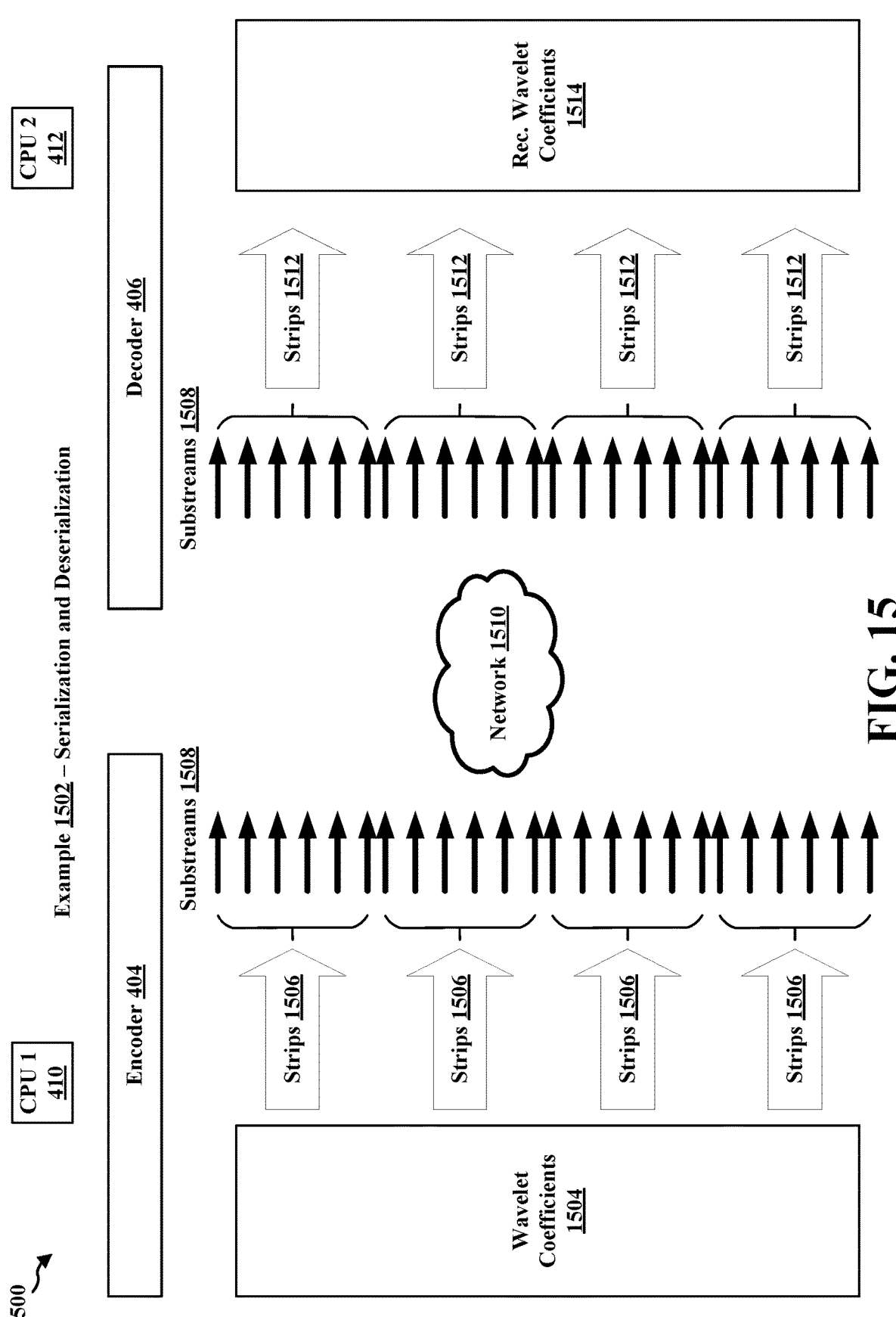
FIG. 15 is a diagram illustrating an example of serialization and deserialization in accordance with one or more techniques of this disclosure.

FIG. 15 is a diagram 1500 illustrating an example 1502 of serialization and deserialization in accordance with one or more techniques of this disclosure. The example 1502 may correspond to the serialization 426 and the deserialization 430 in FIG. 4. The encoder 404 may generate wavelet coefficients 1504 via DWT(s) as described above in the description of FIGS. 4-9.

The first CPU 410 of the encoder 404 may divide the wavelet coefficients 1504 in strips 1506. The first CPU 410 may further divide the strips into substreams 1508, where each substream in the substreams 1508 may include 60 lines (e.g., horizontal lines) corresponding to an input image (e.g., the first frame 418). The first CPU 410 (e.g., via a serializer) may truncate bits from each of the substreams 1508 as calculated by an entropy coding process (e.g., the entropy coding implementation 1002) corresponding to the description of FIGS. 10-14 above. The first CPU 410 may independently serialize and transmit each of the substreams 1508 over a network 1510 (e.g., a wireless network, a wired network etc.). The (serialized) substreams 1508 may include serialized wavelet coefficients that have bits truncated therefrom as calculated by the entropy coding process.

The decoder 406 may obtain (e.g., receive) the substreams 1508 over the network 1510. The second CPU 412 may independently receive and deserialize each of the substreams 1508. The second CPU 412 of the decoder 406 may combine the substreams 1508 into strips 1512 corresponding to the strips 1506. The second CPU 412 may combine the strips 1512 to generate reconstructed wavelet coefficients 1514, where the reconstructed wavelet coefficients 1514 may correspond to the wavelet coefficients 1504. As part of generating the reconstructed wavelet coefficients 1514, the second CPU 412 (e.g., via a deserializer) may add bits (e.g., zero bits) to wavelet coefficients of the strips 1506, where the added bits correspond to the truncated bits as calculated by the entropy coding process.

Figure 16:
FIG. 16 is a diagram illustrating example aspects of an inverse discrete wavelet transform (iDWT) in accordance with one or more techniques of this disclosure.

FIG. 16 is a diagram 1600 illustrating example aspects of an inverse discrete wavelet transform (iDWT) in accordance with one or more techniques of this disclosure. The example aspects in FIG. 16 may correspond to the iDWT 432 in FIG. 4. The iDWT may be an inverse of the second DWT implementation 902 described above in the description of FIG. 9, that is, the iDWT may calculate a 1D output based on an input of H-values and L-values, where the 1D output may include values for rows or columns of pixels.

After performing deserialization, the decoder 406 may reconstruct a final image (e.g., the first reconstructed frame 434) from wavelet coefficients. Performing a iDWT may be more computationally intensive (e.g., memory intensive) on a GPU compared to performing a DWT. As a result, the decoder 406 may divide a workload of the iDWT between the DSP 414 and the second GPU 416. In an example, the DSP 414 may perform an iDWT on a first slice of wavelet coefficients and the second GPU 416 may perform an iDWT on a second slice of wavelet coefficients, a third slice of wavelet coefficients, and a fourth slice of wavelet coefficients. Other divisions may also be utilized. For instance, the DSP 414 may perform an iDWT on the first slice of wavelet coefficients and the second slice of wavelet coefficients and the second GPU 416 may perform an iDWT on the third slice of wavelet coefficients and the fourth slice of wavelet coefficients. An output of the iDWT may be an image that may be presented on a display panel (e.g., the display(s) 131).

As illustrated in FIG. 16, the decoder 406 may obtain an input 1602. The input 1602 may be deserialized wavelet coefficients divided into four slices. The DSP 414 and the second GPU may perform an iDWT on the input 1602. The diagram 1600 depicts an intermediate view 1604 of the input 1602 prior to completion of the iDWT. The diagram 1600 also depicts a view of the input 1602 after iDWT completion 1606.

The processes described above as being performed by the encoder 404 and the decoder 406 (i.e., an improved JPEG XS) may differ from encoding/decoding processes performed as part of the JPEG XS standard. Table 1 below details such differences.

TABLE 1

| | | | JPEG XS Specification vs. Improved JPEG XS | |
| --- | --- | --- | --- | --- |
| ID | Stage | Name | JPEG XS | Improved JPEG XS |
| 1 | Input | Input Data Scaling | Input data is called to achieve nominal precision of wavelet coefficients (20 bits). | No Scaling. Input is converted to YUV. |

TABLE 1-continued

| | | | JPEG XS Specification vs. Improved JPEG XS | |
|---|---|---|---|---|
| ID | Stage | Name | JPEG XS | Improved JPEG XS |
| 2 | Input | DC Level Shift | Input data is shifted to achieve DC level of 0 in an input signal. | DC Level shift not performed. |
| 3 | DWT | Wavelet coefficient bandwidth/storage | 20 bits. | 10 bits. |
| 4 | DWT | Math Precision | 32-bit integer precision. | 16-bit integer precision. |
| 5 | DWT | Single-Pass Execution | Calculation of high-pass and low-pass wavelet coefficients as two separate execution passes over output data from a previous pass. | Single pass. |
| 6 | EC | Coding Techniques | Performs search over a wide range of coding techniques to maximize a compression ratio. | Uses predetermined set of coding techniques. Wavelet coefficients in coding groups are coded as follows: MSB of a coding group is coded as raw (4 bits per MSB given 10 bits of storage) Payload (data bits) of coding group is coded suing a custom version of unary coding Special signaling for 0 s. |
| 7 | EC | Scenario/Refinement Search | Calculates multiple candidate scenario values per precinct with refinement step. | Calculates multiple candidate scenario values per precinct, then searches for a scenario value that minimizes truncation, but that maximizes an available budget for a current precinct. No refinement step, as EC produces a single scenario value per precinct, rather than a scenario value per wavelet band. |
| 8 | EC | Precinct Data | Precincts are built by copying coefficients from different wavelet bands. | Fills precincts with wavelet coefficients that are adjacent in image space. Each precinct is effectively a horizontal strip of a post-DWT image |
| 9 | iDWT | Wavelet coefficient bandwidth/storage | 20 bits. | 10 bits. |

TABLE 1-continued

| | | | JPEG XS Specification vs. Improved JPEG XS | |
| --- | --- | --- | --- | --- |
| ID | Stage | Name | JPEG XS | Improved JPEG XS |
| 10 | iDWT | Math Precision | 32-bit integer precision. | 16-bit integer precision. |
| 11 | iDWT | Single-pass Execution | Generation of samples as 2 separate execution passes over wavelet data. | Single Pass. |
| 12 | Output | DC Level Shift | Decoder reverses DC level shift performed by encoder | No. |

With respect to ID 1 in Table 1, skipping input data scaling and converting to YUV format may keep a DWT/iDWT within a range of 16-bit math and 10-bit storage. Skipping the input data scaling and converting to YUV format may improve performance/power of an encoder (e.g., the encoder 404) and may not have an observable quality impact on a still image. With respect to ID 2 in Table 1, skipping a DC level shift may improve performance/power of the encoder and may not have an observable quality impact on a still image.

With respect to ID 3 in Table 1, using 10-bit storage may minimize an amount of data transferred between memory and a GPU (e.g., the first GPU 408). Using 10-bit storage may improve performance/power of the encoder and may have a minimal impact on a quality of a still image. With respect to ID 4 in Table 1, using 16-bit integer precision may improve power/performance of the encoder and may have a minimal impact on a quality of a still image. With respect to ID 5 in Table 1, performing calculations in a single pass may improve power/performance of the encoder and may not have an impact on a quality of a still image.

With respect to ID 6 in Table 1, using a predetermined set of coding techniques may improve power/performance of the encoder and may not have an observable impact on a quality of a still image in most scenarios. Some impact may be observed in scenes with high-frequency image content (e.g., grass, forest, etc.). With respect to ID 7 in Table 1, calculating multiple candidate scenario values without a refinement step may improve power/performance of the encoder and may not have an observable impact on a quality of a still image in most scenarios. Some impact may be observed in scenes with high-frequency image content (e.g., grass, forest, etc.). With respect to ID 8 in Table 1, filling precincts with wavelet coefficients that are adjacent in an image space may improve power/performance of the encoder and may not have an observable impact on a quality of a still image in most scenarios. Some impact may be observed in scenes with high-frequency image content (e.g., grass, forest, etc.). Filling precincts with wavelet coefficients that are adjacent in an image space may be more suitable for a memory access pattern of a GPU compared to building precincts by copying coefficients from different wavelet bands.

With respect to ID 9 in Table 1, using 10-bit storage may minimize an amount of data transferred between memory and a GPU (e.g., the second GPU 416). Using 10-bit storage may improve performance/power of a decoder (e.g., the decoder 406) and may have a minimal impact on a quality of a still image. With respect to ID 10 in Table 1, using 16-bit integer precision may improve power/performance of the decoder and may have a minimal impact on a quality of a still image. With respect to ID 11 in Table 1, generating samples in a single pass may improve power/performance of the decoder and may have no impact on a quality of a still image.

With respect to ID 12 in Table 1, skipping a DC level shift may improve power/performance of the decoder and may have no observable impact on a quality of a still image. Furthermore, the decoder may skip the DC level shift as the encoder may not perform a DC level shift on the input data.

In one aspect, graphical user interface (GUI) rendering (which may also be referred to as user interface (UI) rendering) may embedded into a last iDWT pass (e.g., a last iDWT pass associated with the iDWT 432). A UI may refer to an interface that enables users to interact with electronic devices through graphic icons. The render of the GUI may be written directly to a swapchain. A swapchain may refer to a series of virtual framebuffers used by a GPU (e.g., the second GPU 416) and graphics application programming interfaces (APIs) for frame rate stabilization, stutter reduction, and other purposes.

In one aspect, an encoder (e.g., the encoder 404) may operate on a YUV texture. The encoder may apply a per-plane DWT. Each plane may utilize a separate dispatch. There may be 16-bit per-texel storage for each plane. In an example, there may be 7×3 compute shader dispatches per slice.

In one aspect, an output of an iDWT may be in YUV format. In such an aspect, a decoder (e.g., the decoder 406) may (1) upscale the output of the iDWT, (2) sharpen the output of the iDWT, and (3) convert the output from YUV format to RGB format. In another aspect, an output of an iDWT may be in RGB format. In such an aspect, a decoder (e.g., the decoder 406) may perform hardware upscaling and sharpening, where the hardware upscaling and sharpening may be implemented in a DPU.

Figure 17:
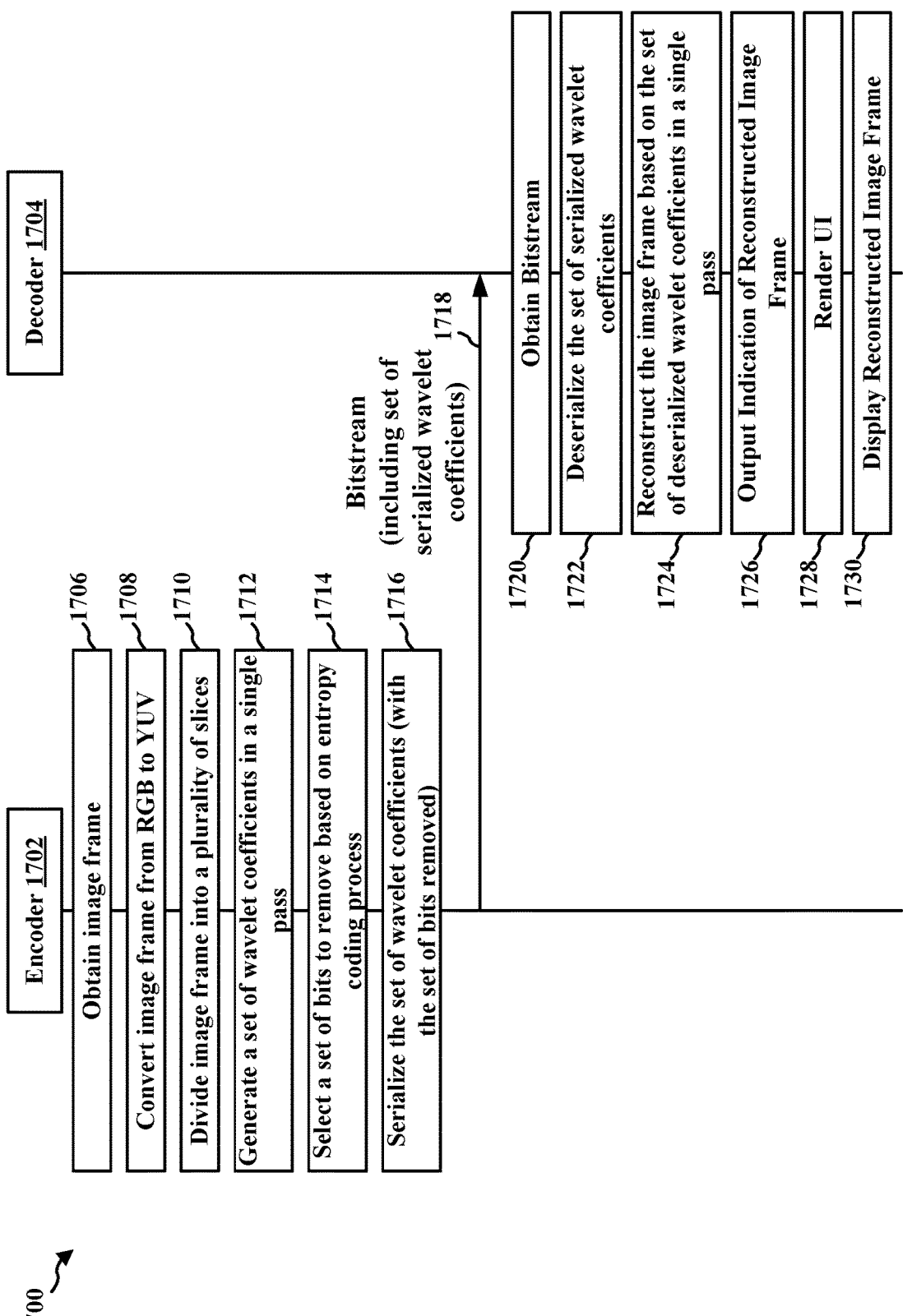
FIG. 17 is a call flow diagram illustrating example communications between an encoder and a decoder in accordance with one or more techniques of this disclosure.

FIG. 17 is a call flow diagram 1700 illustrating example communications between an encoder 1702 and a decoder 1704 in accordance with one or more techniques of this disclosure. In an example, the encoder 1702 may be or include the encoder 404 or the encoder 504. In an example, the decoder 1704 may be the decoder 406 or the decoder 506. In an example, the encoder 1702 and/or the decoder 1704 may be or include the device 104. In an example, the encoder 1702 may be included in the first device 405 and the decoder 1704 may be included in the second device 407. In an example, the encoder 1702 may include CPU(s) and/or GPU(s). The encoder 1702 may also include DSP(s). In an example, the decoder 1704 may include CPU(s), GPU(s), and/or DSP(s).

At 1712, the encoder 1702 may generate, in a single pass for each of a plurality of horizontal and vertical divisions of an image frame, a set of wavelet coefficients for the image frame based on a discrete wavelet transform (DWT). At 1714, the encoder 1702 may select a set of bits associated with the set of wavelet coefficients to remove based on an entropy coding process. At 1716, the encoder 1702 may serialize the set of wavelet coefficients, where the set of serialized wavelet coefficients do not include the set of bits. At 1718, the encoder 1702 may output, for a second device, a bitstream including the set of serialized wavelet coefficients.

At 1710, the encoder 1702 may divide the image frame into a plurality of image slices, where generating the set of wavelet coefficients for the image frame at 1712 may include performing a plurality of DWTs on each of the plurality of image slices, respectively. At 1706, the encoder 1702 may obtain, prior to the generation of the set of wavelet coefficients at 1712, the image frame. At 1708, the encoder 1702 may convert, prior to the generation of the set of wavelet coefficients at 1712 and subsequent to the obtainment of the image frame at 1706, the image frame from a red green blue (RGB) format to a luminance chrominance (YUV) format.

At 1720, the decoder 1704 may obtain a bitstream associated with an image frame associated with a first device, where the bitstream may include set of serialized wavelet coefficients associated with the image frame. At 1722, the decoder 1704 may deserialize the set of serialized wavelet coefficients, where the set of deserialized wavelet coefficients may include a set of additional bits corresponding to a set of wavelet coefficients associated with the set of serialized wavelet coefficients. At 1724, the decoder 1704 may reconstruct, in a single pass for each of a plurality of horizontal and vertical divisions of the image frame, the image frame based on the set of deserialized wavelet coefficients based on an inverse discrete wavelet transform (iDWT). At 1726, the decoder 1704 may output an indication of the reconstructed image frame. At 1728, the decoder 1704 may render, based on the reconstructed the image frame, a user interface (UI) associated with the image frame, where the rendering of the UI utilizes on-chip graphics processor memory. At 1730, the decoder 1704 may display the reconstructed image frame.

FIG. 18 is a flowchart 1800 of an example method of graphics processing in accordance with one or more techniques of this disclosure. The method may be performed by an apparatus, such as an apparatus for graphics processing, a GPU, a CPU, a DSP, a first device including an encoder (such as the first device 405 that includes the encoder 404), a wireless communication device, and the like, as used in connection with the aspects of FIGS. 1-17. The method may be associated with various advantages at the apparatus, such as facilitating wireless streaming of high-resolution images between two wireless devices in a high-performance, low-latency, and energy efficient manner. In an example, the method may be performed by the encoder 198.

At 1802, the first device generates, in a single pass for each of a plurality of horizontal and vertical divisions of an image frame, a set of wavelet coefficients for the image frame based on a discrete wavelet transform (DWT). For example, FIG. 17 at 1712 shows that the encoder 1702 may generate, in a single pass for each of a plurality of horizontal and vertical divisions of an image frame, a set of wavelet coefficients for the image frame based on a discrete wavelet transform (DWT). In an example, the DWT may be or include the DWT 420 and/or the DWT 524. In an example, the DWT may include aspects described above in connection with FIGS. 6-7 and 9. In an example, the DWT may be or include the second DWT implementation 902 and the single pass may be the single pass 906. In an example, the set of wavelet coefficients may be the output 908. In an example, the set of wavelet coefficients may be or include the wavelet coefficients 1006. In an example, the image frame may be or include the first frame 418, the second frame 436, the third frame 438, the input image frame 518, and/or the input image 602. In an example, 1802 may be performed by the encoder 198.

At 1804, the first device selects a set of bits associated with the set of wavelet coefficients to remove based on an entropy coding process. For example, FIG. 17 at 1714 shows that the encoder 1702 may select a set of bits associated with the set of wavelet coefficients to remove based on an entropy coding process. In an example, the entropy coding process may correspond to the EC 424. In an example, the entropy coding process may be or include the entropy coding implementation 1002. For instance, the entropy coding process may include aspects described above in connection with FIGS. 10-14. In an example, the set of bits may correspond to scenario 0, scenario 1, or scenario 2 in FIG. 14. In an example, 1804 may be performed by the encoder 198.

At 1806, the first device serializes the set of wavelet coefficients, where the set of serialized wavelet coefficients do not include the set of bits. For example, FIG. 17 at 1716 shows that the encoder 1702 may serialize the set of wavelet coefficients, where the set of serialized wavelet coefficients do not include the set of bits. In an example, serializing the set of wavelet coefficients may include the serialization 426. In an example, serializing the set of wavelet coefficients may include aspects described above in connection with FIG. 15. For instance, serializing the set of wavelet coefficients may correspond to serializing the wavelet coefficients 1504. In an example, 1806 may be performed by the encoder 198.

At 1808, the first device outputs, for a second device, a bitstream including the set of serialized wavelet coefficients. For example, FIG. 17 at 1718 shows that the encoder 1702 may output, for a second device, a bitstream including the set of serialized wavelet coefficients. In an example, the second device may be the second device 407. In an example, the second device may include the decoder 1704. In an example, FIG. 15 shows that the encoder 404 may output, for a second device, a bitstream including the set of serialized wavelet coefficients. In an example, the bitstream may correspond to the substreams 1508 or the transmission at 428. In an example, the bitstream may correspond to the BG 532. In an example, 1808 may be performed by the encoder 198.

Figure 19:
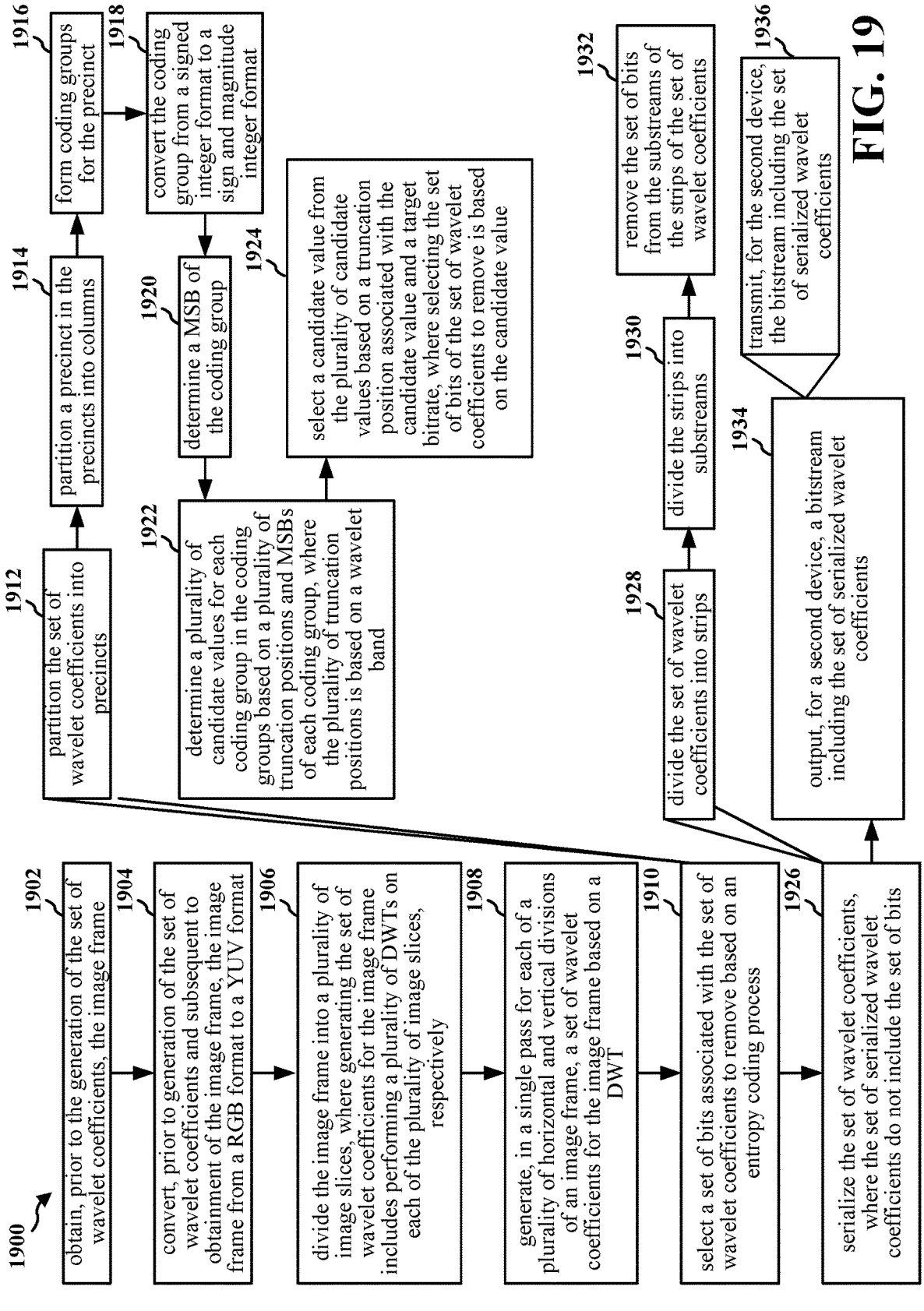
FIG. 19 is a flowchart of an example method of graphics processing in accordance with one or more techniques of this disclosure.

FIG. 19 is a flowchart 1900 of an example method of graphics processing in accordance with one or more techniques of this disclosure. The method may be performed by an apparatus, such as an apparatus for graphics processing, a GPU, a CPU, a DSP, a first device including an encoder (such as the first device 405 that includes the encoder 404), a wireless communication device, and the like, as used in connection with the aspects of FIGS. 1-17. The method may be associated with various advantages at the apparatus, such as facilitating wireless streaming of high-resolution images between two wireless devices in a high-performance, low-latency, and energy efficient manner. In an example, the method (including the various aspects detailed below) may be performed by the encoder 198.

At 1908, the first device generates, in a single pass for each of a plurality of horizontal and vertical divisions of an image frame, a set of wavelet coefficients for the image frame based on a discrete wavelet transform (DWT). For example, FIG. 17 at 1712 shows that the encoder 1702 may generate, in a single pass for each of a plurality of horizontal and vertical divisions of an image frame, a set of wavelet coefficients for the image frame based on a discrete wavelet transform (DWT). In an example, the DWT may be or include the DWT 420 and/or the DWT 524. In an example, the DWT may include aspects described above in connection with FIGS. 6-7 and 9. In an example, the DWT may be or include the second DWT implementation 902 and the single pass may be the single pass 906. In an example, the set of wavelet coefficients may be the output 908. In an example, the set of wavelet coefficients may be or include the wavelet coefficients 1006. In an example, the image frame may be or include the first frame 418, the second frame 436, the third frame 438, the input image frame 518, and/or the input image 602. In an example, 1908 may be performed by the encoder 198.

At 1910, the first device selects a set of bits associated with the set of wavelet coefficients to remove based on an entropy coding process. For example, FIG. 17 at 1714 shows that the encoder 1702 may select a set of bits associated with the set of wavelet coefficients to remove based on an entropy coding process. In an example, the entropy coding process may correspond to the EC 424. In an example, the entropy coding process may be or include the entropy coding implementation 1002. For instance, the entropy coding process may include aspects described above in connection with FIGS. 10-14. In an example, the set of bits may correspond to scenario 0, scenario 1, or scenario 2 in FIG. 14. In an example, 1910 may be performed by the encoder 198.

At 1926, the first device serializes the set of wavelet coefficients, where the set of serialized wavelet coefficients do not include the set of bits. For example, FIG. 17 at 1716 shows that the encoder 1702 may serialize the set of wavelet coefficients, where the set of serialized wavelet coefficients do not include the set of bits. In an example, serializing the set of wavelet coefficients may include the serialization 426. In an example, serializing the set of wavelet coefficients may include aspects described above in connection with FIG. 15. For instance, serializing the set of wavelet coefficients may correspond to serializing the wavelet coefficients 1504. In an example, 1926 may be performed by the encoder 198.

At 1934, the first device outputs, for a second device, a bitstream including the set of serialized wavelet coefficients. For example, FIG. 17 at 1718 shows that the encoder 1702 may output, for a second device, a bitstream including the set of serialized wavelet coefficients. In an example, the second device may be the second device 407. In an example, the second device may include the decoder 1704. In an example, FIG. 15 shows that the encoder 404 may output, for a second device, a bitstream including the set of serialized wavelet coefficients. In an example, the bitstream may correspond to the substreams 1508 or the transmission at 428. In an example, the bitstream may correspond to the BG 532. In an example, 1934 may be performed by the encoder 198.

In one aspect, at 1906, the first device may divide the image frame into a plurality of image slices, where generating the set of wavelet coefficients for the image frame may include performing a plurality of DWTs on each of the plurality of image slices, respectively. For example, FIG. 17 at 1710 shows that the encoder 1702 may divide the image frame into a plurality of image slices, where generating the set of wavelet coefficients for the image frame at 1712 may include performing a plurality of DWTs on each of the plurality of image slices, respectively. In an example, the plurality of image slices may be or include the slices 422. In an example, dividing the image frame into the plurality of images slices may correspond to the input image 602. In an example, 1906 may be performed by the encoder 198.

In one aspect, at 1902, the first device may obtain, prior to the generation of the set of wavelet coefficients, the image frame. For example, FIG. 17 at 1706 shows that the encoder 1702 may obtain, prior to the generation of the set of wavelet coefficients at 1712, the image frame. In another example, FIG. 4 shows that the first device 405 may obtain the first frame 418. In an example, 1902 may be performed by the encoder 198.

In one aspect, at 1904, the first device may convert, prior to the generation of the set of wavelet coefficients and subsequent to the obtainment of the image frame, the image frame from a red green blue (RGB) format to a luminance chrominance (YUV) format. For example, FIG. 17 at 1708 shows that the encoder 1702 may convert, prior to the generation of the set of wavelet coefficients at 1712 and subsequent to the obtainment of the image frame at 1706, the image frame from a red green blue (RGB) format to a luminance chrominance (YUV) format. In an example, 1904 may be performed by the encoder 198.

In one aspect, generating the set of wavelet coefficients may include generating the set of wavelet coefficients in the single pass without intermediate storage. For example, generating the set of wavelet coefficients at 1712 may include generating the set of wavelet coefficients in the single pass without intermediate storage. Furthermore, FIG. 9 also shows that generating the set of wavelet coefficients may include generating the set of wavelet coefficients in the single pass without intermediate storage.

In one aspect, generating the set of wavelet coefficients may include: performing the DWT on the image frame based on one or more 16-bit precision computations in order to generate the set of wavelet coefficients. For example, generating the set of wavelet coefficients at 1712 may include performing the DWT on the image frame based on one or more 16-bit precision computations in order to generate the set of wavelet coefficients.

In one aspect, generating the set of wavelet coefficients may include: allocating the set of wavelet coefficients to a 12-10-10-bit storage format based on the one or more 16-bit precision computations. For example, generating the set of wavelet coefficients at 1712 may include: allocating the set of wavelet coefficients to a 12-10-10-bit storage format based on the one or more 16-bit precision computations.

In one aspect, at 1912, selecting the set of bits of the set of wavelet coefficients to remove based on the entropy coding process may include: partitioning the set of wavelet coefficients into precincts, where each precinct in the precincts may be associated with a plurality of horizontal lines associated with the image frame. For example, selecting the set of bits of the set of wavelet coefficients to remove based on the entropy coding process at 1714 may include: partitioning the set of wavelet coefficients into precincts, where each precinct in the precincts may be associated with a plurality of horizontal lines associated with the image frame. The aforementioned aspect may correspond to 1008 and/or the example 1102. In an example, the precincts may be or include the precincts 1104. In an example, 1912 may be performed by the encoder 198.

In one aspect, at 1914, selecting the set of bits of the set of wavelet coefficients to remove based on the entropy coding process may include: partitioning a precinct in the precincts into columns, where selecting the set of bits may be based on at least one of the precincts or the columns. For example, selecting the set of bits of the set of wavelet coefficients to remove based on the entropy coding process at 1714 may include: partitioning a precinct in the precincts into columns, where selecting the set of bits may be based on at least one of the precincts or the columns. The aforementioned aspect may correspond to 1010 and/or the first example 1202. For instance, the columns may be or include the columns 1204. In an example, 1914 may be performed by the encoder 198.

In one aspect, at 1916, selecting the set of bits of the set of wavelet coefficients to remove based on the entropy coding process may further include: forming coding groups for the precinct, where a coding group for the precinct may include a number of adjacent wavelet coefficients associated with a same luminance or brightness component of the image frame. For example, selecting the set of bits of the set of wavelet coefficients to remove based on the entropy coding process at 1714 may further include: forming coding groups for the precinct, where a coding group for the precinct may include a number of adjacent wavelet coefficients associated with a same luminance or brightness component of the image frame. The aforementioned aspect may correspond to 1012 and/or the second example 1206. For instance, the coding groups may be or include the coding groups 1216. A luminance or brightness component may be or include the Y components 1210, the U components 1212, or the V components 1214. In an example, 1916 may be performed by the encoder 198.

In one aspect, at 1918, selecting the set of bits of the set of wavelet coefficients to remove based on the entropy coding process may further include: converting the coding group from a signed integer format to a sign and magnitude integer format. For example, selecting the set of bits of the set of wavelet coefficients to remove based on the entropy coding process at 1714 may further include: converting the coding group from a signed integer format to a sign and magnitude integer format. The aforementioned aspect may correspond to 1016 and/or the first example 1302. For instance, the coding group (in signed integer format) may be or include the coding group 1304 and the coding group (in sign and magnitude integer format) may be or include the coding group 1306. In an example, 1918 may be performed by the encoder 198.

In one aspect, at 1920, selecting the set of bits of the set of wavelet coefficients to remove based on the entropy coding process may further include: determining a most significant bit (MSB) of the coding group, where selecting the set of bits may be based on the MSB of the coding group. For example, selecting the set of bits of the set of wavelet coefficients to remove based on the entropy coding process at 1714 may further include: determining a most significant bit (MSB) of the coding group, where selecting the set of bits may be based on the MSB of the coding group. The aforementioned aspect may correspond to 1016 and/or the second example 1308. In an example, 1920 may be performed by the encoder 198.

In one aspect, at 1922, selecting the set of bits of the set of wavelet coefficients to remove based on the entropy coding process may further include: determining a plurality of candidate values for each coding group in the coding groups based on a plurality of truncation positions and MSBs of each coding group, where the plurality of truncation positions may be based on a wavelet band. For example, selecting the set of bits of the set of wavelet coefficients to remove based on the entropy coding process at 1714 may further include: determining a plurality of candidate values for each coding group in the coding groups based on a plurality of truncation positions and MSBs of each coding group, where the plurality of truncation positions may be based on a wavelet band. The aforementioned aspect may correspond to the 1018 and/or the example 1402. For example, the set of bits may correspond to bits in the scenarios 1404 (e.g., scenario 0, scenario 1, scenario 2, etc.).

In an example, the MSB may be the MSB 1416. In an example, the plurality of truncation positions may be or include position 0 1408, position 3 1410, or position 6 1412. In an example, the candidate values may correspond to the scenarios 1404. In an example, 1922 may be performed by the encoder 198.

In one aspect, at 1924, selecting the set of bits of the set of wavelet coefficients to remove based on the entropy coding process may further include: selecting a candidate value from the plurality of candidate values based on a truncation position associated with the candidate value and a target bitrate, where selecting the set of bits of the set of wavelet coefficients to remove may be based on the candidate value. For example, selecting the set of bits of the set of wavelet coefficients to remove based on the entropy coding process at 1714 may further include: selecting a candidate value from the plurality of candidate values based on a truncation position associated with the candidate value and a target bitrate, where selecting the set of bits of the set of wavelet coefficients to remove may be based on the candidate value. The aforementioned aspect may correspond to 1018, 1020, and 1022. In an example, 1924 may be performed by the encoder 198.

In one aspect, at 1928, serializing the set of wavelet coefficients may include: dividing the set of wavelet coefficients into strips. For example, serializing the set of wavelet coefficients at 1716 may include: dividing the set of wavelet coefficients into strips. In an example, the strips may be or include the strips 1506. In an example, 1928 may be performed by the encoder 198.

In one aspect, at 1930, serializing the set of wavelet coefficients may include: dividing the strips into substreams, where each substream may correspond to a plurality of lines of the image frame. For example, serializing the set of wavelet coefficients at 1716 may include: dividing the strips into substreams, where each substream may correspond to a plurality of lines of the image frame. In an example, the substreams may be or include the substreams 1508. In an example, 1930 may be performed by the encoder 198.

In one aspect, at 1932, serializing the set of wavelet coefficients may include: removing the set of bits from the substreams of the strips of the set of wavelet coefficients. For example, serializing the set of wavelet coefficients at 1716 may include: removing the set of bits from the substreams of the strips of the set of wavelet coefficients. In an example, the (removed) set of bits may correspond to the scenarios 1404. In an example, 1932 may be performed by the encoder 198.

In one aspect, the first device may include at least one of a central processing unit (CPU) or a graphics processor. For example, the CPU may be or include the first CPU 410 and the graphics processor may be or include the first GPU 408.

In one aspect, at 1936, outputting the bitstream may include: transmitting, for the second device, the bitstream including the set of serialized wavelet coefficients. For example, outputting the bitstream at 1718 may include: transmitting, for the second device, the bitstream including the set of serialized wavelet coefficients. Furthermore, FIG. 4 shows that the first device 405 may transmit, for the second device 407, the bitstream including the set of serialized wavelet coefficients.

In one aspect, the first device may be a first wireless device and the second device may be a second wireless device. For example, the first device 405 may be a first wireless device and the second device 407 may be a second wireless device.

FIG. 20 is a flowchart 2000 of an example method of graphics processing in accordance with one or more techniques of this disclosure. The method may be performed by an apparatus, such as an apparatus for graphics processing, a GPU, a CPU, a DSP, a second device including a decoder (such as the second device 407 that includes the decoder 406), a wireless communication device, and the like, as used in connection with the aspects of FIGS. 1-17. The method may be associated with various advantages at the apparatus, such as facilitating wireless streaming of high-resolution images between two wireless devices in a high-performance, low-latency, and energy efficient manner. In an example, the method may be performed by the decoder 199.

At 2002, a second device obtains a bitstream associated with an image frame associated with a first device, where the bitstream includes a set of serialized wavelet coefficients associated with the image frame. For example, FIG. 17 at 1720 shows that the decoder 1704 may obtain a bitstream associated with an image frame associated with a first device, where the bitstream includes a set of serialized wavelet coefficients associated with the image frame. In an example, the first device may be the first device 405. In an example, the image frame may be or include the first frame 418, the second frame 436, the third frame 438, the input image frame 518, and/or the input image 602. In an example, the set of serialized wavelet coefficients may correspond to the example 1502 in FIG. 15. In an example, the bitstream may correspond to the substreams 1508 or the transmission at 428. In an example, the bitstream may correspond to the BG 546. In an example, 2002 may be performed by the decoder 199.

At 2004, the second device deserializes the set of serialized wavelet coefficients, where the set of deserialized wavelet coefficients includes a set of additional bits corresponding to a set of wavelet coefficients associated with the set of serialized wavelet coefficients. For example, FIG. 17 at 1722 shows that the decoder 1704 may deserialize the set of serialized wavelet coefficients, where the set of deserialized wavelet coefficients includes a set of additional bits corresponding to a set of wavelet coefficients associated with the set of serialized wavelet coefficients. In an example, deserializing the set of serialized wavelet coefficients may include aspects described above in connection with the example 1502. In an example, the set of deserialized wavelet coefficients may be or include the reconstructed wavelet coefficients 1514. In an example, the set of additional bits may correspond to bits that were truncated from the wavelet coefficients 1504 prior to bitstream generation. In an example, deserializing the set of serialized wavelet coefficients may be or include the deserialization 430. In an example, 2004 may be performed by the decoder 199.

At 2006, the second device reconstructs, in a single pass for each of a plurality of horizontal and vertical divisions of the image frame, the image frame based on the set of deserialized wavelet coefficients based on an inverse discrete wavelet transform (iDWT). For example, FIG. 17 at 1724 shows that the decoder 1704 may reconstruct, in a single pass for each of a plurality of horizontal and vertical divisions of the image frame, the image frame based on the set of deserialized wavelet coefficients based on an inverse discrete wavelet transform (iDWT). In an example, the iDWT may include aspects described above in connection with FIG. 16. In an example, the iDWT may be an inverse of the second DWT implementation 902, that is, the iDWT may generate pixel values based on a set of deserialized wavelet coefficients. In an example, the iDWT may be or include the iDWT 432. In an example, 2006 may be performed by the decoder 199.

At 2008, the second device outputs an indication of the reconstructed image frame. For example, FIG. 17 at 1726 shows that the decoder 1704 may output an indication of the reconstructed image frame. In an example, the reconstructed image frame may correspond to the view of the input 1602 after iDWT completion 1606. In an example, 2008 may be performed by the decoder 199.

Figure 21:
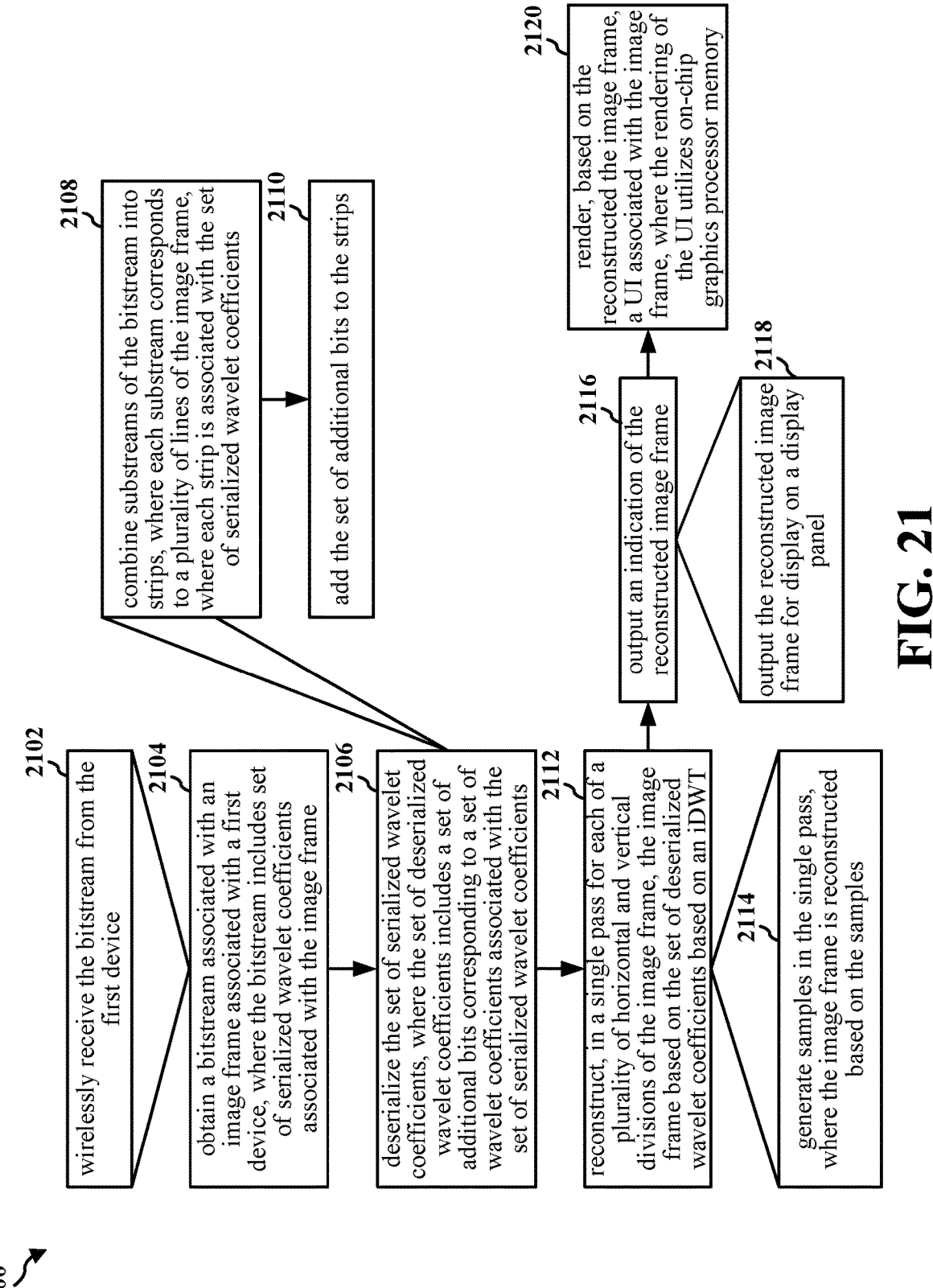
FIG. 21 is a flowchart of an example method of graphics processing in accordance with one or more techniques of this disclosure.

FIG. 21 is a flowchart 2100 of an example method of graphics processing in accordance with one or more techniques of this disclosure. The method may be performed by an apparatus, such as an apparatus for graphics processing, a GPU, a CPU, a DSP, a second device including a decoder (such as the second device 407 that includes the decoder 406), a wireless communication device, and the like, as used in connection with the aspects of FIGS. 1-17. The method may be associated with various advantages at the apparatus, such as facilitating wireless streaming of high-resolution images between two wireless devices in a high-performance, low-latency, and energy efficient manner. In an example, the method (including the various aspects detailed below) may be performed by the decoder 199.

At 2104, a second device obtains a bitstream associated with an image frame associated with a first device, where the bitstream includes a set of serialized wavelet coefficients associated with the image frame. For example, FIG. 17 at 1720 shows that the decoder 1704 may obtain a bitstream associated with an image frame associated with a first device, where the bitstream includes a set of serialized wavelet coefficients associated with the image frame. In an example, the first device may be the first device 405. In an example, the image frame may be or include the first frame 418, the second frame 436, the third frame 438, the input image frame 518, and/or the input image 602. In an example, the set of serialized wavelet coefficients may correspond to the example 1502 in FIG. 15. In an example, the bitstream may correspond to the substreams 1508 or the transmission at 428. In an example, the bitstream may correspond to the BG 546. In an example, 2104 may be performed by the decoder 199.

At 2106, the second device deserializes the set of serialized wavelet coefficients, where the set of deserialized wavelet coefficients includes a set of additional bits corresponding to a set of wavelet coefficients associated with the set of serialized wavelet coefficients. For example, FIG. 17 at 1722 shows that the decoder 1704 may deserialize the set of serialized wavelet coefficients, where the set of deserialized wavelet coefficients includes a set of additional bits corresponding to a set of wavelet coefficients associated with the set of serialized wavelet coefficients. In an example, deserializing the set of serialized wavelet coefficients may include aspects described above in connection with the example 1502. In an example, the set of deserialized wavelet coefficients may be or include the reconstructed wavelet coefficients 1514. In an example, the set of additional bits may correspond to bits that were truncated from the wavelet coefficients 1504 prior to bitstream generation. In an example, deserializing the set of serialized wavelet coefficients may be or include the deserialization 430. In an example, 2106 may be performed by the decoder 199.

At 2112, the second device reconstructs, in a single pass for each of a plurality of horizontal and vertical divisions of the image frame, the image frame based on the set of deserialized wavelet coefficients based on an inverse discrete wavelet transform (iDWT). For example, FIG. 17 at 1724 shows that the decoder 1704 may reconstruct, in a single pass for each of a plurality of horizontal and vertical divisions of the image frame, the image frame based on the set of deserialized wavelet coefficients based on an inverse discrete wavelet transform (iDWT). In an example, the iDWT may include aspects described above in connection with FIG. 16. In an example, the iDWT may be an inverse of the second DWT implementation 902, that is, the iDWT may generate pixel values based on a set of deserialized wavelet coefficients. In an example, the iDWT may be or include the iDWT 432. In an example, 2112 may be performed by the decoder 199.

At 2116, the second device outputs an indication of the reconstructed image frame. For example, FIG. 17 at 1726 shows that the decoder 1704 may output an indication of the reconstructed image frame. In an example, the reconstructed image frame may correspond to the view of the input 1602 after iDWT completion 1606. In an example, 2116 may be performed by the decoder 199.

In one aspect, reconstructing the image frame may include: performing the iDWT on the image frame using one or more 16-bit precision computations. For example, reconstructing the image frame at 1724 may include: performing the iDWT on the image frame using one or more 16-bit precision computations.

In one aspect, reconstructing the image frame may include: allocating the set of deserialized wavelet coefficients to a 12-10-10-bit storage format based on the one or more 16-bit precision computations. For example, reconstructing the image frame at 1724 may include: allocating the set of deserialized wavelet coefficients to a 12-10-10-bit storage format based on the one or more 16-bit precision computations In one aspect, the second device may include at least one of a central processing unit (CPU), a graphics processor, or a digital signal processor (DSP). For example, the CPU may be the second CPU 412, the graphics processor may be the second GPU 416, and the DSP may be the DSP 414.

In one aspect, at 2108, deserializing the set of serialized wavelet coefficients may include: combining substreams of the bitstream into strips, where each substream may correspond to a plurality of lines of the image frame, where each strip may be associated with the set of serialized wavelet coefficients. For example, deserializing the set of serialized wavelet coefficients at 1722 may include: combining substreams of the bitstream into strips, where each substream may correspond to a plurality of lines of the image frame, where each strip may be associated with the set of serialized wavelet coefficients. Furthermore, FIG. 15 shows that deserializing the set of serialized wavelet coefficients may include: combining substreams of the bitstream into strips, where each substream may correspond to a plurality of lines of the image frame, where each strip may be associated with the set of serialized wavelet coefficients. For instance, the substreams may be the substream 1508 and the strips may include the strip 1512. In an example, 2108 may be performed by the decoder 199.

In one aspect, at 2110, deserializing the set of serialized wavelet coefficients may include: adding the set of additional bits to the strips. For example, deserializing the set of serialized wavelet coefficients at 1722 may include: adding the set of additional bits to the strips. In an example, 2110 may be performed by the decoder 199.

In one aspect, the first device may be a first wireless device and the second device may be a second wireless device. For example, the first device 405 may be a first wireless device and the second device 407 may be a second wireless device.

In one aspect, at 2114, reconstructing the image frame based on the set of deserialized wavelet coefficients may include generating samples in the single pass, where reconstructing the image frame may be based on the samples. For example, reconstructing the image frame based on the set of deserialized wavelet coefficients at 1724 may include generating samples in the single pass, where reconstructing the image frame may be based on the samples. In an example, the samples may correspond to an inverse of the entropy coding implementation 1002. In an example, 2114 may be performed by the decoder 199.

In one aspect, at 2102, obtaining the bitstream associated with the image frame associated with the first device may include wirelessly receiving the bitstream from the first device. For example, obtaining the bitstream associated with the image frame associated with the first device at 1720 may include wirelessly receiving the bitstream from the first device. In an example, 2102 may be performed by the decoder 199.

In one aspect, at 2118, outputting the indication of the reconstructed image frame may include: outputting the reconstructed image frame for display on a display panel. For example, outputting the indication of the reconstructed image frame at 1726 may include: outputting the reconstructed image frame for display on a display panel. In an example, the display panel may be or include the display(s) 131. In an example, 2118 may be performed by the decoder 199.

In one aspect, at 2120, the second device may render, based on the reconstructed the image frame, a user interface (UI) associated with the image frame, where the rendering of the UI may utilize on-chip graphics processor memory. For example, FIG. 17 at 1730 shows that the decoder 1704 may render, based on the reconstructed the image frame, a user interface (UI) associated with the image frame, where the rendering of the UI may utilize on-chip graphics processor memory. In an example, 2120 may be performed by the decoder 199.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for generating, in a single pass for each of a plurality of horizontal and vertical divisions of an image frame, a set of wavelet coefficients for the image frame based on a discrete wavelet transform (DWT). The apparatus may further include means for selecting a set of bits associated with the set of wavelet coefficients to remove based on an entropy coding process. The apparatus may further include means for serializing the set of wavelet coefficients, where the set of serialized wavelet coefficients do not include the set of bits. The apparatus may further include means for outputting, for a second device, a bitstream including the set of serialized wavelet coefficients. The apparatus may further include means for dividing the image frame into a plurality of image slices, where generating the set of wavelet coefficients for the image frame includes performing a plurality of DWTs on each of the plurality of image slices, respectively. The apparatus may further include means for obtaining, prior to the generation of the set of wavelet coefficients, the image frame. The apparatus may further include means for converting, prior to the generation of the set of wavelet coefficients and subsequent to the obtainment of the image frame, the image frame from a red green blue (RGB) format to a luminance chrominance (YUV) format.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for obtaining a bitstream associated with an image frame associated with a first device, where the bitstream includes a set of serialized wavelet coefficients associated with the image frame. The apparatus may further include means for deserializing the set of serialized wavelet coefficients, where the set of deserialized wavelet coefficients includes a set of additional bits corresponding to a set of wavelet coefficients associated with the set of serialized wavelet coefficients. The apparatus may further include means for reconstructing, in a single pass for each of a plurality of horizontal and vertical divisions of the image frame, the image frame based on the set of deserialized wavelet coefficients based on an inverse discrete wavelet transform (iDWT). The apparatus may further include means for outputting an indication of the reconstructed image frame. The apparatus may further include means for rendering, based on the reconstructed the image frame, a user interface (UI) associated with the image frame, where the rendering of the UI utilizes on-chip graphics processor memory.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing at a first device, including: generating, in a single pass for each of a plurality of horizontal and vertical divisions of an image frame, a set of wavelet coefficients for the image frame based on a discrete wavelet transform (DWT); selecting a set of bits associated with the set of wavelet coefficients to remove based on an entropy coding process; serializing the set of wavelet coefficients, wherein the set of serialized wavelet coefficients do not include the set of bits; and outputting, for a second device, a bitstream including the set of serialized wavelet coefficients.

Aspect 2 may be combined with aspect 1, and further comprises: dividing the image frame into a plurality of image slices, wherein generating the set of wavelet coefficients for the image frame includes performing a plurality of DWTs on each of the plurality of image slices, respectively.

Aspect 3 may be combined with any of aspects 1-2, and further comprises: obtaining, prior to the generation of the set of wavelet coefficients, the image frame.

Aspect 4 may be combined with aspect 3, and further comprises: converting, prior to the generation of the set of wavelet coefficients and subsequent to the obtainment of the image frame, the image frame from a red green blue (RGB) format to a luminance chrominance, the image frame based on the set of deserialized wavelet coefficients based on an inverse discrete wavelet transform (iDWT); and outputting an indication of the reconstructed image frame.

Aspect 5 may be combined with any of aspects 1-4, wherein generating the set of wavelet coefficients includes generating the set of wavelet coefficients in the single pass without intermediate storage.

Aspect 6 may be combined with any of aspects 1-5, wherein generating the set of wavelet coefficients includes: performing the DWT on the image frame based on a 16-bit precision computation in order to generate the set of wavelet coefficients; and allocating the set of wavelet coefficients to a 12-10-10-bit storage format based on the 16-bit precision computation.

Aspect 7 may be combined with any of aspects 1-6, wherein selecting the set of bits of the set of wavelet coefficients to remove based on the entropy coding process includes: partitioning the set of wavelet coefficients into precincts, wherein each precinct in the precincts is associated with a plurality of horizontal lines associated with the image frame; and partitioning a precinct in the precincts into columns, wherein selecting the set of bits is based on at least one of the precincts or the columns.

Aspect 8 may be combined with aspect 7, wherein selecting the set of bits of the set of wavelet coefficients to remove based on the entropy coding process further includes: forming coding groups for the precinct, wherein a coding group for the precinct includes a number of adjacent wavelet coefficients associated with a same luminance or brightness component of the image frame; converting the coding group from a signed integer format to a sign and magnitude integer format; and determining a most significant bit (MSB) of the coding group, wherein selecting the set of bits is based on the MSB of the coding group.

Aspect 9 may be combined with aspect 8, wherein selecting the set of bits of the set of wavelet coefficients to remove based on the entropy coding process further includes: determining a plurality of candidate values for each coding group in the coding groups based on a plurality of truncation positions and MSBs of each coding group, wherein the plurality of truncation positions is based on a wavelet band; and selecting a candidate value from the plurality of candidate values based on a truncation position associated with the candidate value and a target bitrate, wherein selecting the set of bits of the set of wavelet coefficients to remove is based on the candidate value.

Aspect 10 may be combined with any of aspects 1-9, wherein serializing the set of wavelet coefficients includes: dividing the set of wavelet coefficients into strips; dividing the strips into substreams, wherein each substream corresponds to a plurality of lines of the image frame; and removing the one or more bits from the substreams of the strips of the set of wavelet coefficients.

Aspect 11 may be combined with any of aspects 1-10, wherein the first device includes at least one of a central processing unit (CPU) or a graphics processor.

Aspect 12 may be combined with any of aspects 1-11, wherein outputting the bitstream includes: transmitting, for the second device, the bitstream including the set of serialized wavelet coefficients.

Aspect 13 may be combined with any of aspects 1-12, wherein the first device is a first wireless device and the second device is a second wireless device.

Aspect 14 is an apparatus for graphics processing at a first device comprising a memory and a processor coupled to the memory and, based on information stored in the memory, the processor is configured to implement a method as in any of aspects 1-14.

Aspect 15 may be combined with aspect 14 and comprises that the first device is a first wireless device comprising at least one of a transceiver or an antenna coupled to the processor, and wherein to transmit the bitstream, the processor is configured to transmit the bitstream via at least one of the transceiver or the antenna.

Aspect 16 is an apparatus for graphics processing comprising means for implementing a method as in any of aspects 1-14.

Aspect 17 is a computer-readable medium (e.g., a non-transitory computer readable-medium) storing computer executable code, the computer executable code, when executed by a processor, causes the processor to implement a method as in any of aspects 1-14.

Aspect 18 is a method of graphics processing at a second device, including: obtaining a bitstream associated with an image frame associated with a first device, wherein the bitstream includes set of serialized wavelet coefficients associated with the image frame; deserializing the set of serialized wavelet coefficients, wherein the set of deserialized wavelet coefficients includes a set of additional bits corresponding to a set of wavelet coefficients associated with the set of serialized wavelet coefficients; reconstructing, in a single pass for each of a plurality of horizontal and vertical divisions of the image frame, the image frame based on the set of deserialized wavelet coefficients based on an inverse discrete wavelet transform (iDWT); and outputting an indication of the reconstructed image frame.

Aspect 19 may be combined with aspect 18, wherein reconstructing the image frame includes: performing the iDWT on the image frame using one or more 16-bit precision computations; and allocating the set of deserialized wavelet coefficients to a 12-10-10-bit storage format based on the one or more 16-bit precision computations.

Aspect 20 may be combined with any of aspects 18-19, wherein the second device includes at least one of a central processing unit (CPU), a graphics processor, or a digital signal processor (DSP).

Aspect 21 may be combined with any of aspects 18-20, wherein deserializing the set of serialized wavelet coefficients includes: combining substreams of the bitstream into strips, wherein each substream corresponds to a plurality of lines of the image frame, wherein each strip is associated with the set of serialized wavelet coefficients; and adding the set of additional bits to the strips.

Aspect 22 may be combined with any of aspects 18-21, wherein the first device is a first wireless device and the second device is a second wireless device.

Aspect 23 may be combined with any of aspects 18-22, wherein reconstructing the image frame based on the set of deserialized wavelet coefficients includes generating samples in the single pass, and wherein reconstructing the image frame is based on the samples.

Aspect 24 may be combined with any of aspects 18-23, wherein obtaining the bitstream associated with the image frame associated with the first device includes wirelessly receiving the bitstream from the first device.

Aspect 25 may be combined with any of aspects 18-24, wherein outputting the indication of the reconstructed image frame includes: outputting the reconstructed image frame for display on a display panel.

Aspect 26 may be combined with any of aspects 18-25, and further comprises: rendering, based on the reconstructed the image frame, a user interface (UI) associated with the image frame, wherein the rendering of the UI utilizes on-chip graphics processor memory.

Aspect 27 is an apparatus for graphics processing at a first device comprising a memory and a processor coupled to the memory and, based on information stored in the memory, the processor is configured to implement a method as in any of aspects 18-26.

Aspect 28 may be combined with aspect 27 and comprises that the second device is a second wireless device comprising at least one of a transceiver or an antenna coupled to the processor, and wherein to obtain the bitstream, the processor is configured to obtain the bitstream via at least one of the transceiver or the antenna.

Aspect 29 is an apparatus for graphics processing comprising means for implementing a method as in any of aspects 18-26.

Aspect 30 is a computer-readable medium (e.g., a non-transitory computer readable-medium) storing computer executable code, the computer executable code, when executed by a processor, causes the processor to implement a method as in any of aspects 18-26.

Various aspects have been described herein. These and other aspects are within the scope of the following claims.

What is claimed is:

1. An apparatus for graphics processing at a first device, comprising:
   a memory; and
   a processor coupled to the memory and, based on information stored in the memory, the processor is configured to:
      generate, in a single pass for each of a plurality of horizontal and vertical divisions of an image frame, a set of wavelet coefficients for the image frame based on a discrete wavelet transform (DWT), wherein to generate the set of wavelet coefficients, the processor is configured to:
         perform the DWT on the image frame based on a 16-bit precision computation in order to generate the set of wavelet coefficients; and
         allocate the set of wavelet coefficients to a 12-10-10-bit storage format based on the 16-bit precision computation;
      select a set of bits associated with the set of wavelet coefficients to remove based on an entropy coding process;
      serialize the set of wavelet coefficients, wherein the set of serialized wavelet coefficients do not include the set of bits; and
      output, for a second device, a bitstream including the set of serialized wavelet coefficients.

2. The apparatus of claim 1, wherein the processor is further configured to:
   divide the image frame into a plurality of image slices, wherein to generate the set of wavelet coefficients for the image frame, the processor is configured to perform a plurality of DWTs on each of the plurality of image slices, respectively.

3. The apparatus of claim 1, wherein the processor is further configured to:
   obtain, prior to the generation of the set of wavelet coefficients, the image frame.

4. The apparatus of claim 3, wherein the processor is further configured to:
   convert, prior to the generation of the set of wavelet coefficients and subsequent to the obtainment of the image frame, the image frame from a red green blue (RGB) format to a luminance chrominance (YUV) format.

5. The apparatus of claim 1, wherein to generate the set of wavelet coefficients, the processor is configured to generate the set of wavelet coefficients in the single pass without intermediate storage.

6. The apparatus of claim 1, wherein to select the set of bits of the set of wavelet coefficients to remove based on the entropy coding process, the processor is configured to:
   partition the set of wavelet coefficients into precincts, wherein each precinct in the precincts is associated with a plurality of horizontal lines associated with the image frame; and
   partition a precinct in the precincts into columns, wherein to select the set of bits, the processor is configured to select the set of bits based on at least one of the precincts or the columns.

7. The apparatus of claim 6, wherein to select the set of bits of the set of wavelet coefficients to remove based on the entropy coding process, the processor is configured to:
   form coding groups for the precinct, wherein a coding group for the precinct comprises a number of adjacent wavelet coefficients associated with a same luminance or brightness component of the image frame;
   convert the coding group from a signed integer format to a sign and magnitude integer format; and
   determine a most significant bit (MSB) of the coding group, wherein to select the set of bits, the processor is configured to select the set of bits based on the MSB of the coding group.

8. The apparatus of claim 7, wherein to select the set of bits of the set of wavelet coefficients to remove based on the entropy coding process, the processor is configured to:
   determine a plurality of candidate values for each coding group in the coding groups based on a plurality of truncation positions and MSBs of each coding group, wherein the plurality of truncation positions is based on a wavelet band; and select a candidate value from the plurality of candidate values based on a truncation position associated with the candidate value and a target bitrate, wherein to select the set of bits of the set of wavelet coefficients to remove, the processor is configured to select the set of bits based on the candidate value.

9. The apparatus of claim 1, wherein to serialize the set of wavelet coefficients, the processor is configured to:

divide the set of wavelet coefficients into strips;

divide the strips into substreams, wherein each substream corresponds to a plurality of lines of the image frame; and remove the set of bits from the substreams of the strips of the set of wavelet coefficients.

10. The apparatus of claim 1, wherein the first device comprises at least one of a central processing unit (CPU) or a graphics processor.

11. The apparatus of claim 1, wherein to output the bitstream, the processor is configured to:

transmit, for the second device, the bitstream including the set of serialized wavelet coefficients.

12. The apparatus of claim 11, wherein the first device is a first wireless device comprising at least one of a transceiver or an antenna coupled to the processor, and wherein to transmit the bitstream, the processor is configured to transmit the bitstream via at least one of the transceiver or the antenna.

13. An apparatus for graphics processing at a second device, comprising:

a memory; and a processor coupled to the memory and, based on information stored in the memory, the processor is configured to:

obtain a bitstream associated with an image frame associated with a first device, wherein the bitstream includes a set of serialized wavelet coefficients associated with the image frame;

deserialize the set of serialized wavelet coefficients, wherein the set of deserialized wavelet coefficients includes a set of additional bits corresponding to a set of wavelet coefficients associated with the set of serialized wavelet coefficients;

reconstruct, in a single pass for each of a plurality of horizontal and vertical divisions of the image frame, the image frame based on the set of deserialized wavelet coefficients based on an inverse discrete wavelet transform (iDWT), wherein to reconstruct the image frame, the processor is configured to:

perform the iDWT on the image frame using one or more 16-bit precision computations; and allocate the set of deserialized wavelet coefficients to a 12-10-10-bit storage format based on the one or more 16-bit precision computations; and output an indication of the reconstructed image frame.

14. The apparatus of claim 13, wherein the second device comprises at least one of a central processing unit (CPU), a graphics processor, or a digital signal processor (DSP).

15. The apparatus of claim 13, wherein to deserialize the set of serialized wavelet coefficients, the processor is configured to:

combine substreams of the bitstream into strips, wherein each substream corresponds to a plurality of lines of the image frame, wherein each strip is associated with the set of serialized wavelet coefficients; and add the set of additional bits to the strips.

16. The apparatus of claim 13, wherein the second device is a second wireless device comprising at least one of a transceiver or an antenna coupled to the processor, and wherein to obtain the bitstream, the processor is configured to obtain the bitstream via at least one of the transceiver or the antenna.

17. The apparatus of claim 13, wherein to reconstruct the image frame based on the set of deserialized wavelet coefficients, the processor is configured to generate samples in the single pass, and wherein to reconstruct the image frame, the processor is configured to reconstruct the image frame based on the samples.

18. The apparatus of claim 13, wherein to output the indication of the reconstructed image frame, the processor is configured to:

output the reconstructed image frame for display on a display panel.

19. The apparatus of claim 13, wherein the processor is further configured to:

render, based on the reconstructed the image frame and via on-chip graphics processor memory, a user interface (UI) associated with the image frame.

20. A method of graphics processing at a first device, comprising:

generating, in a single pass for each of a plurality of horizontal and vertical divisions of an image frame, a set of wavelet coefficients for the image frame based on a discrete wavelet transform (DWT), wherein generating the set of wavelet coefficients comprises:

performing the DWT on the image frame based on one or more 16-bit precision computations in order to generate the set of wavelet coefficients; and allocating the set of wavelet coefficients to a 12-10-10-bit storage format based on the one or more 16-bit precision computations;

selecting a set of bits associated with the set of wavelet coefficients to remove based on an entropy coding process;

serializing the set of wavelet coefficients, wherein the set of serialized wavelet coefficients do not include the set of bits; and outputting, for a second device, a bitstream including the set of serialized wavelet coefficients.

21. The method of claim 20, further comprising:

dividing the image frame into a plurality of image slices, wherein generating the set of wavelet coefficients for the image frame comprises performing a plurality of DWTs on each of the plurality of image slices, respectively.

22. The method of claim 20, further comprising:

obtaining, prior to the generation of the set of wavelet coefficients, the image frame.

23. The method of claim 22, further comprising:

converting, prior to the generation of the set of wavelet coefficients and subsequent to the obtainment of the image frame, the image frame from a red green blue (RGB) format to a luminance chrominance (YUV) format.

24. The method of claim 20, wherein generating the set of wavelet coefficients comprises generating the set of wavelet coefficients in the single pass without intermediate storage.

25. The method of claim 20, wherein selecting the set of bits of the set of wavelet coefficients to remove based on the entropy coding process comprises:

partitioning the set of wavelet coefficients into precincts, wherein each precinct in the precincts is associated with a plurality of horizontal lines associated with the image frame; and partitioning a precinct in the precincts into columns, wherein selecting the set of bits is based on at least one of the precincts or the columns.

26. The method of claim 25, wherein selecting the set of bits of the set of wavelet coefficients to remove based on the entropy coding process further comprises:

forming coding groups for the precinct, wherein a coding group for the precinct comprises a number of adjacent wavelet coefficients associated with a same luminance or brightness component of the image frame;

converting the coding group from a signed integer format to a sign and magnitude integer format; and determining a most significant bit (MSB) of the coding group, wherein selecting the set of bits is based on the MSB of the coding group.

27. The method of claim 26, wherein selecting the set of bits of the set of wavelet coefficients to remove based on the entropy coding process comprises:

determining a plurality of candidate values for each coding group in the coding groups based on a plurality of truncation positions and MSBs of each coding group, wherein the plurality of truncation positions is based on a wavelet band; and selecting a candidate value from the plurality of candidate values based on a truncation position associated with the candidate value and a target bitrate, wherein selecting the set of bits of the set of wavelet coefficients to remove comprises selecting the set of bits based on the candidate value.

28. The method of claim 20, wherein serializing the set of wavelet coefficients comprises:

dividing the set of wavelet coefficients into strips;

dividing the strips into substreams, wherein each substream corresponds to a plurality of lines of the image frame; and removing the set of bits from the substreams of the strips of the set of wavelet coefficients.

29. A method of graphics processing at a second device, comprising:

obtaining a bitstream associated with an image frame associated with a first device, wherein the bitstream includes a set of serialized wavelet coefficients associated with the image frame;

deserializing the set of serialized wavelet coefficients, wherein the set of deserialized wavelet coefficients includes a set of additional bits corresponding to a set of wavelet coefficients associated with the set of serialized wavelet coefficients;

reconstructing, in a single pass for each of a plurality of horizontal and vertical divisions of the image frame, the image frame based on the set of deserialized wavelet coefficients based on an inverse discrete wavelet transform (iDWT), wherein reconstructing the image frame comprises:

performing the iDWT on the image frame using one or more 16-bit precision computations; and allocating the set of deserialized wavelet coefficients to a 12-10-10-bit storage format based on the one or more 16-bit precision computations; and outputting an indication of the reconstructed image frame.

30. The method of claim 29, wherein deserializing the set of serialized wavelet coefficients comprises:

combining substreams of the bitstream into strips, wherein each substream corresponds to a plurality of lines of the image frame, wherein each strip is associated with the set of serialized wavelet coefficients; and adding the set of additional bits to the strips.

\* \* \* \* \*